(12) United States Patent
Casey et al.

(10) Patent No.: US 11,963,203 B2
(45) Date of Patent: Apr. 16, 2024

(54) SYSTEMS AND METHODS FOR MANAGING RADIO FREQUENCY SPECTRUM IN GROUND TO AERIAL VEHICLE COMMUNICATIONS

(71) Applicant: Aura Network Systems, Inc., Mclean, VA (US)

(72) Inventors: Tamara Lynne Casey, Annapolis, MD (US); Michael Robert Gagne, Monrovia, MD (US)

(73) Assignee: AURA Network Systems, Inc., McLean, VA (US)

( * ) Notice: Subject to any disclaimer, the term of this patent is extended or adjusted under 35 U.S.C. 154(b) by 0 days.

(21) Appl. No.: 17/569,379

(22) Filed: Jan. 5, 2022

(65) Prior Publication Data
US 2022/0217706 A1     Jul. 7, 2022

Related U.S. Application Data

(60) Provisional application No. 63/293,579, filed on Dec. 23, 2021, provisional application No. 63/217,466, (Continued)

(51) Int. Cl.
*H04W 72/51*       (2023.01)
*G08G 5/00*        (2006.01)
(Continued)

(52) U.S. Cl.
CPC .......... *H04W 72/51* (2023.01); *G08G 5/0039* (2013.01); *H04W 28/26* (2013.01); *H04W 84/005* (2013.01)

(58) Field of Classification Search
CPC ... H04W 72/51; H04W 28/26; H04W 84/005; H04W 16/10; H04W 16/04;
(Continued)

(56) References Cited

U.S. PATENT DOCUMENTS 6,018,659 A * 1/2000 Ayyagari ........... H04B 7/18504
                                                  342/450
6,163,681 A * 12/2000 Wright ............... H04B 7/18506
                                                  455/66.1
(Continued)

FOREIGN PATENT DOCUMENTS

CA         2189494 A1 *  5/1997
CN         108173590 A    6/2018
(Continued)

OTHER PUBLICATIONS

P. Jacob, R. P. Sirigina, A. S. Madhukumar and V. A. Prasad, "Cognitive Radio for Aeronautical Communications: A Survey," in IEEE Access, vol. 4, pp. 3417-3443, 2016, doi: 10.1109/ACCESS.2016.2570802. (Year: 2016).*
(Continued)

*Primary Examiner* — Yuwen Pan
*Assistant Examiner* — Swati Jain
(74) *Attorney, Agent, or Firm* — Kubota & Basol LLP

(57) ABSTRACT

Disclosed herein is a terrestrial to air communications network that can be configured to include a spectrum management system that deterministically allocates spectrum to aircraft for use during flight. In one or more examples, a user transmits a flight plan to a spectrum management system that is configured to manage the RF spectrum in a given air space. In one or more examples, and based on the received flight plan, the spectrum management system can allocate an RF spectrum frequency "slot" (i.e., timeslot, subchannel, or resource block) for the aircraft to use during its intended flight. The spectrum management system can take into account available spectrum as well as the predicted network traffic and their spectrum allocations to determine an RF spectrum slot that can provide a stable
(Continued)

and continuous communications channel to the aircraft during its flight.

42 Claims, 12 Drawing Sheets

Related U.S. Application Data filed on Jul. 1, 2021, provisional application No. 63/134,521, filed on Jan. 6, 2021.

(51) Int. Cl.
*H04W 28/26* (2009.01)
*H04W 84/00* (2009.01)

(58) Field of Classification Search
CPC ............ H04W 72/0446; G08G 5/0039; H04B 7/18506; H04B 7/18504
See application file for complete search history.

(56) References Cited

U.S. PATENT DOCUMENTS

| | | | | |
|---|---|---|---|---|
| 6,167,239 | A * | 12/2000 | Wright | H04B 7/18506 |
| | | | | 455/66.1 |
| 6,944,475 | B1 * | 9/2005 | Campbell | G06F 13/38 |
| | | | | 455/431 |
| 8,615,263 | B2 * | 12/2013 | Madon | H04W 16/04 |
| | | | | 455/431 |
| 8,897,770 | B1 * | 11/2014 | Frolov | H04W 84/06 |
| | | | | 455/13.1 |
| 8,914,022 | B2 * | 12/2014 | Kostanic | H04B 7/18508 |
| | | | | 455/431 |
| 9,185,603 | B1 * | 11/2015 | McCarthy | H04W 28/20 |
| 9,319,172 | B2 * | 4/2016 | Jalali | H01Q 13/02 |
| 9,596,053 | B1 | 3/2017 | Marupaduga et al. | |
| 9,734,723 | B1 * | 8/2017 | Bruno | B64C 39/024 |
| 10,304,343 | B2 * | 5/2019 | Mustafic | G08G 5/0039 |
| 10,354,536 | B1 | 7/2019 | Hegranes et al. | |
| 10,372,122 | B2 * | 8/2019 | Zach | H04L 12/6418 |
| 11,603,200 | B2 * | 3/2023 | Bruhn | B64C 39/024 |
| 11,804,141 | B2 * | 10/2023 | Chase | G05D 1/0027 |
| 2001/0052875 | A1 | 12/2001 | Kohno et al. | |
| 2005/0108374 | A1 * | 5/2005 | Pierzga | H04B 7/18504 |
| | | | | 709/223 |
| 2007/0072560 | A1 | 3/2007 | Ishikawa | |
| 2008/0274734 | A1 * | 11/2008 | Kostanic | H04B 7/18506 |
| | | | | 455/431 |
| 2010/0234024 | A1 * | 9/2010 | McGuffin | H04B 7/18506 |
| | | | | 455/436 |
| 2011/0116373 | A1 * | 5/2011 | Lauer | H04W 84/005 |
| | | | | 370/232 |
| 2011/0257874 | A1 * | 10/2011 | Judd | G08G 5/0021 |
| | | | | 701/122 |
| 2012/0270531 | A1 * | 10/2012 | Wright | G08G 5/0021 |
| | | | | 455/419 |
| 2012/0282962 | A1 * | 11/2012 | Madon | H04W 16/04 |
| | | | | 455/509 |
| 2014/0024365 | A1 * | 1/2014 | Mitchell | H04B 7/212 |
| | | | | 455/431 |
| 2014/0274103 | A1 * | 9/2014 | Steer | H04W 76/36 |
| | | | | 455/454 |
| 2015/0139073 | A1 * | 5/2015 | Buchwald | H04W 52/245 |
| | | | | 370/327 |
| 2016/0119938 | A1 * | 4/2016 | Frerking | H04B 7/15507 |
| | | | | 370/316 |
| 2016/0275801 | A1 * | 9/2016 | Kopardekar | G08G 5/0082 |
| 2017/0059688 | A1 | 3/2017 | Gan | |
| 2017/0215178 | A1 * | 7/2017 | Kim | H04W 72/51 |
| 2017/0278410 | A1 | 9/2017 | Byers et al. | |
| 2018/0061251 | A1 * | 3/2018 | Venkatraman | G01C 21/20 |
| 2018/0164441 | A1 | 6/2018 | Feria et al. | |
| 2018/0324881 | A1 | 11/2018 | Gagne | |
| 2018/0375568 | A1 * | 12/2018 | De Rosa | H04B 7/18506 |
| 2019/0012923 | A1 * | 1/2019 | Weisbrod | G01S 19/46 |
| 2019/0260462 | A1 * | 8/2019 | Axmon | H04B 7/18506 |
| 2019/0306675 | A1 | 10/2019 | Xue et al. | |
| 2019/0331800 | A1 | 10/2019 | Espeland et al. | |
| 2020/0043351 | A1 * | 2/2020 | Hunter | G08G 5/0013 |
| 2020/0154426 | A1 | 5/2020 | Takács et al. | |
| 2020/0372808 | A1 | 11/2020 | Carraway et al. | |
| 2021/0035457 | A1 | 2/2021 | Pennapareddy | |
| 2021/0282129 | A1 * | 9/2021 | Kim | H04W 72/51 |
| 2022/0166525 | A1 * | 5/2022 | De Rosa | H04B 15/00 |
| 2022/0302968 | A1 | 9/2022 | Casey et al. | |
| 2022/0383760 | A1 | 12/2022 | Casey et al. | |
| 2023/0245571 | A1 | 8/2023 | Casey et al. | |

FOREIGN PATENT DOCUMENTS

| | | | | |
|---|---|---|---|---|
| CN | 109450515 | A | 3/2019 | |
| CN | 112116830 | A | 12/2020 | |
| KR | 1788721 | B1 * | 10/2017 | ............ B64C 39/02 |
| WO | WO-2007020475 | A1 * | 2/2007 | ............ F16L 55/48 |
| WO | 2018/178750 | A1 | 10/2018 | |
| WO | 2019/086821 | A1 | 5/2019 | |
| WO | 2020/113062 | A1 | 6/2020 | |
| WO | WO-2020263393 | A9 * | 2/2021 | ........... B64C 39/024 |
| WO | WO-2022217530 | A1 * | 10/2022 | |
| WO | WO-2023194013 | A1 * | 10/2023 | |

OTHER PUBLICATIONS

E. J. Knoblock et al., "Investigation and Evaluation of Advanced Spectrum Management Concepts for Aeronautical Communications," 2021 Integrated Communications Navigation and Surveillance Conference (ICNS), Dulles, VA, USA, 2021, pp. 1-12, doi: 10.1109/ICNS52807.2021.9441662. (Year: 2021).*

Reyes, H., Gellerman, N., & Kaabouch, N. (2015). A cognitive radio system for improving the reliability and security of UAS/UAV networks doi:http://dx.doi.org/10.1109/AERO.2015.7119159 (Year: 2015).*

Apaza, R. D., Knoblock, E. J., & Li, H. (2020). A new spectrum management concept for future NAS communications doi:http://dx.doi.org/10.1109/DASC50938.2020.9256637 (Year: 2020).*

P. Jacob, R. P. Sirigina, A. S. Madhukumar and V. A. Prasad, "Cognitive Radio for Aeronautical Communications: A Survey," in IEEE Access, vol. 4, pp. 3417-3443, 2016. (Year: 2016).*

R. D. Apaza, E. J. Knoblock and H. Li, "A New Spectrum Management Concept for Future NAS Communications," 2020 AIAA/IEEE 39th Digital Avionics Systems Conference (DASC), San Antonio, TX, USA, 2020, pp. 1-7. (Year: 2020).*

L. Z. Ribeiro, L. C. Monticone, R. E. Snow, F. Box, R. Apaza and S. Bretmersky, "A framework for dimensioning VDL-2 air-ground networks," 2014 Integrated Communications, Navigation and Surveillance Conference (ICNS) Conference Proceedings, Herndon, VA, USA, 2014, pp. Q3-1-Q3-14. (Year: 2014).*

Jacob, P., Madhukumar, A. S., & Vinod, A. P. (2015). Efficient aviation spectrum management through dynamic frequency allocation. (Year: 2015).*

Casey et al., U.S. Office Action dated Feb. 2, 2023, directed to U.S. Appl. No. 17/580,292; 25 pages.

Casey et al., U.S. Office Action dated Oct. 3, 2022, directed to U.S. Appl. No. 17/580,292; 24 pages.

International Search Report and Written Opinion dated Mar. 21, 2023, directed to International Application No. PCT/US2023/060402; 12 pages.

International Search Report and Written Opinion dated Apr. 19, 2022, directed to International Application No. PCT/US2022/070050; 12 pages.

International Search Report and Written Opinion dated Apr. 22, 2022, directed to International Application No. PCT/US2022/070272; 13 pages.

International Search Report and Written Opinion dated Sep. 21, 2022, directed to International Application No. PCT/US2022/072699; 19 pages.

(56) References Cited

OTHER PUBLICATIONS

Wang et al. (May 2021). "Blockchain enabled verification for cellular-connected unmanned aircraft system networking", Future Generation Computer Systems 123: 233-244.
Non-Final Office Action received for U.S. Appl. No. 17/580,292, dated Jun. 26, 2023, 26 pages.
Notice of Allowance received for U.S. Appl. No. 17/580,292, dated Nov. 8, 2023, 8 pages.

* cited by examiner

SYSTEMS AND METHODS FOR MANAGING RADIO FREQUENCY SPECTRUM IN GROUND TO AERIAL VEHICLE COMMUNICATIONS

CROSS-REFERENCE TO RELATED APPLICATIONS

This application claims benefit to U.S. Provisional Application No. 63/293,579, filed Dec. 23, 2021, U.S. Provisional Application No. 63/217,466, filed Jul. 1, 2021, and U.S. Provisional Application No. 63/134,521, filed Jan. 6, 2021, the entire contents of each of which are incorporated herein by reference.

FIELD

This disclosure relates to RF spectrum management in an air to ground communications network, and more specifically, to systems and methods for allocating RF narrowband spectrum channels to airborne assets to facilitate communications with a ground-based communications network.

BACKGROUND

One of the critical features of air safety for both manned and unmanned flights is the ability for airborne assets to communicate with the ground so as to relay operationally critical communications. Ensuring that an airborne asset can maintain a continuous and uninterrupted communications link to the ground ensures that the airborne asset is able to receive necessary information from ground controllers as well as transmit necessary information to the ground controllers at any and all points during a given flight.

The proliferation of airborne assets, and specifically unmanned aerial vehicles (UAVs) has complicated the task of ensuring that each airborne asset has continuous communications channel with a ground station. UAVs are now capable of flying long distances across a broad array of geographic areas, all the while having specialized communications requirements with the ground. For instance, UAV operators based on the ground must be in constant communication with the UAV not only to provide instructions to the UAV from the ground, but to also receive critical telemetry from the UAV that informs the ground-based operator about the UAV's operational status.

Ensuring the performance of the critical data link between a ground base station and remote radios for aviation operations in airspace is critical to supporting the safety requirements of manned, unmanned and optionally piloted flights. Data links need to meet the reliability, integrity and availability performance targets set forth by regulators. Ensuring a continuous data link for remote radios can be challenging in environment in which there are many airborne assets are transiting an airspace at any given time. The availability of RF spectrum specifically can be a challenging issue. With increasing air traffic comes an increasing potential for the communications of one aircraft to interfere with the communications of another during a flight. Network interference can further be exacerbated when aircraft in a given network are transiting across large geographic areas and thus must rely on multiple ground base stations during its flight to maintain a continuous communications link with the ground.

SUMMARY

According to an aspect, a terrestrial to air communications network can be configured to include a spectrum management system that deterministically allocates spectrum to aircraft for use during flight. In one or more examples, a user wishing to fly an aircraft transmits a flight plan to a spectrum management system that is configured to manage the RF spectrum in a given air space. In one or more examples, the flight plan can include the intended geographic route of the aircraft, the beginning time of the flight, the expected end time of the flight, as well as operational details of the flight such as the data throughput requirement and the radio configuration of the aircraft. In one or more examples, and based on the received flight plan, the spectrum management system can allocate an RF spectrum frequency "slot" (i.e., timeslot, subchannel, or resource block) for the aircraft to use during its intended flight. In one or more examples, the spectrum management system can choose what spectrum slot to give an aircraft based not only on its flight plan but on other various factors such as a dynamic link budget created for the flight, dynamic RF coverage predictions, and dynamic interference and co-existence (i.e., with other aircraft in time, space, and RF channel utilization) predictions. The spectrum management system can take into account available spectrum as well as the predicted network traffic and their spectrum allocations to determine an RF spectrum slot that can provide a stable and continuous communications channel to the aircraft during its flight.

According to an aspect, the flight plan based dynamic spectrum/traffic channel management system (i.e., the spectrum management system) can reserve and assign spectrum resources available at ground base stations, remote ground based radios and/or remote airborne radios. In one or more examples these spectrum resources can be in both the frequency and time domain of a digital system and include spectrum bandwidth and individual traffic channels called sub-channels or resource blocks within the spectrum bandwidth. In one or more examples, a traffic channel (also referred throughout the disclosure as a sub-channels, frames, resource block, and bearers) can refer to a communications link at a specified frequency that allows data communication between an aircraft and a pilot on an aviation network. In one or more examples, a traffic channel can be represented as a plurality of sub-channels, frames, resource blocks, and bearers. The system looks at several variables such as the available spectrum resources, radio link throughput and performance requirements, location (including elevation), time period as well as the radio frequency environment to assign a non-contended resource between the ground based radios and remote radios. In one or more examples, these variables can be populated by several internal and external components to the spectrum management system. Due to the large volume of information and the potential for spectrum and/or traffic channel requests by thousands of end users in the spectrum management system can include a "digital twin" of the spectrum management system that can be configured to perform the required analysis without affecting the operational system.

According to an aspect, once the spectrum management system determines the RF spectrum slot to provide to an aircraft, the system can transmit the selected RF spectrum slot and additional information about the RF channel (such as modulation scheme, error correction code, etc.) to one or more base stations in the communications network that take the information and execute the RF communications channel during the flight. In one or more examples, the ground base station can include a spectrum monitoring system that is configured to continuously monitor the active RF environment of a given airspace for interference. In one or more examples, if undesired interference is detected that has the potential to impact flight operations, the ground base station can utilize an antenna with null forming, beam steering technology that can direct an interference signal (i.e., a "null") at the unwanted interference source to minimize or remove the interference. In one or more examples, rather than employing a ground-based beam forming antenna, the system can utilize a beam forming antenna that is employed on a satellite.

According to an aspect, a method for allocating RF spectrum channels in an air-to-ground communications network includes receiving a flight plan from a user, wherein the flight plan comprises timing, location, and altitude information for a flight that is to fly in one or more coverage areas of the air-to-ground communications network, determining RF availability in the one or more coverage areas of the communications network based on the received flight plan from the user, selecting one or more RF spectrum channels from a traffic channel pool based on the received flight plan, determining the presence of one or more interfering signals in the communications network based on the received flight plan the selected one or more RF spectrum channels from the traffic channel pool, and if it is determined that there are no interfering signals in the communications networks, reserving the selected one or more RF spectrum channels for the received flight plan.

Optionally, the flight plan comprises information about the radio configuration of an aircraft performing the flight plan.

Optionally, the method comprises determining a throughput requirement of the aircraft based on the received information about the radio configuration of the aircraft performing the flight plan.

Optionally, the flight plan comprises a throughput requirement of an aircraft performing the flight plan.

Optionally, determining RF availability in the one or more coverage areas of the communications network based on the received flight plan from the user comprises: generating one or more dynamic link budgets for the flight based on the received flight plan, wherein each dynamic link budget is configured to determine RF availability of a communications link in one or more coverage areas of the communications network, generating one or more geofences based on the dynamic link budget, and determining RF availability based on the dynamic link budgets corresponding to the one or more coverage areas of the communications network that the aircraft is to fly in based on the received flight plan from the user.

Optionally, generating the one or more dynamic link budgets for the flight includes using a dynamic RF coverage prediction tool to populate one or more parameters of the one or more dynamic link budgets.

Optionally, selecting one or more RF spectrum channels from the traffic channel pool comprises determining a number of RF spectrum channels to assign to the flight based on a throughput requirement of the flight.

Optionally, selecting one or more RF spectrum channels from the traffic channel pool comprises selecting the determined number of RF spectrum channels from the available RF spectrum channels in the traffic channel pool.

Optionally, the traffic channel pool comprises one or more reserved RF spectrum channels, wherein the reserved RF spectrum channels comprise RF spectrum channels that have been already reserved by another flight of the communications network.

Optionally, the traffic channel pool comprises one or more restricted traffic channels, wherein the restricted RF spectrum channels comprise RF spectrum channels reserved for use by the spectrum management system.

Optionally, determining the presence of one or more interfering signals in the communications network comprises using a dynamic interference prediction tool.

Optionally, the method comprises transmitting the selected one or more RF spectrum channels to a third-party regulatory body for approval, and reserving the selected one or more RF spectrum channels for the received flight plan upon receiving approval from the regulatory body.

Optionally, the method comprises transmitting the selected one or more RF spectrum channels to a spectrum management system.

Optionally, the base station controller is configured to operate a communications link between a pilot and an aircraft used to execute the received flight plan during the flight.

Optionally, the method comprises selecting a modulation scheme to operate the communications link between the pilot and the aircraft.

Optionally, the method comprises selecting a forward error correction code to operate the communications link between the pilot and the aircraft.

According to an aspect, A method for implementing and maintaining an RF communications link in an air-to-ground communications network includes receiving information about a flight to take place in one or more coverage areas of the air-to-ground communications network, wherein the information comprises one or more RF spectrum channels associated with the flight, generating an RF communications link at a base station of the communications network between a user and an aircraft flying the flight based on the one or more RF spectrum channels associated with the flight, generating a dynamic link budget for the flight based on the received information and based on one or more conditions of the communications network, determining the presence of one or more performance degradations in the RF communications link during the flight based on the generated dynamic link budget, if one or more performance degradations are determined to be present in the RF communications link, applying one or more mitigations to the RF communications link, and updating the dynamic link budget based on the applied one or more mitigations.

Optionally, the information about a flight to take place in one or more coverage areas of the air-to-ground communications network comprises timing, location, and altitude information for the flight that is to fly in the one or more coverage areas of the air-to-ground communications network.

Optionally, the information comprises information about the radio configuration of the aircraft performing the flight plan.

Optionally, generating an RF communications link at the base station between the user and the aircraft comprises transmitting data from the user to the aircraft at an RF frequency based on the one or more RF spectrum channels associated with the flight.

Optionally, wherein generating an RF communications link at the base station between the user and the aircraft comprises selecting a modulation scheme for communications between the user and the aircraft.

Optionally, generating an RF communications link at the base station between the user and the aircraft comprises selecting a forward error correction code for communications between the user and the aircraft.

Optionally, generating a dynamic link budget for the flight based on the received information and based on one or more conditions of the communications network comprises receiving information from a base station associated with one or more RF environmental conditions at the base station.

Optionally, the information from the base station associated with the one or more RF environmental conditions at the base station is generated by a spectrum monitoring device located at the base station.

Optionally, the information from the base station associated with the one or more RF environmental conditions at the base stations is generated by a base station link monitoring tool configured to detect one or more conditions of the RF communications link between the user and the aircraft.

Optionally, the dynamic link budget is based on the information generated by the spectrum monitoring device and the base station link monitoring tool.

Optionally, the spectrum monitoring device comprises a software defined receiver configured to receive and process RF signals received at a monitoring antenna of the base station.

Optionally, the spectrum monitoring device comprises noise floor monitoring tool configured to detect a power level of a noise floor at the base station.

Optionally, the spectrum monitoring device comprises a undesired signal detection component configured to detect RF signals that are not expected at the base station.

Optionally, the spectrum monitoring device comprises a direction and power detection component configured detect a power and direction of the RF signals that are not expected at the base station.

Optionally, applying one or more mitigations to the RF communications link comprises adjusting one or more parameters associated with the dynamic link budget.

Optionally, adjusting one or more parameters associated with the dynamic link budget comprises increasing a power of the signal transmitted by an antenna of the base station to the aircraft.

Optionally, determining the presence of one or more performance degradations in the RF communications link during the flight based on the generated dynamic link budget comprises determining the presence of one or more interference signals in the RF communications link.

Optionally, determining the presence of one or more interference signals in the RF communications link comprises determining a direction at the base station from which the one or more interference signals are propagating.

Optionally, applying one or more mitigations to the RF communications link comprises controlling a beam steering antenna to transmit a null signal in the direction from which the one or more interference signals are propagating.

According to an aspect, A system for allocating RF spectrum channels in an air-to-ground communications network includes a memory, one or more processors, wherein the memory stores one or more programs that when executed by the one or more processors, cause the one or more processors to receive a flight plan from a user, wherein the flight plan comprises timing, location, and altitude information for a flight that is to fly in one or more coverage areas of the air-to-ground communications network, determine RF availability in the one or more coverage areas of the communications network based on the received flight plan from the user, select one or more RF spectrum channels from a traffic channel pool based on the received flight plan, determine the presence of one or more interfering signals in the communications network based on the received flight plan the selected one or more RF spectrum channels from the traffic channel pool, and if it is determined that there are no interfering signals in the communications networks, reserve the selected one or more RF spectrum channels for the received flight plan.

Optionally, the flight plan comprises information about the radio configuration of an aircraft performing the flight plan.

Optionally, the one or more processors are caused to determine a throughput requirement of the aircraft based on the received information about the radio configuration of the aircraft performing the flight plan.

Optionally, the flight plan comprises a throughput requirement of an aircraft performing the flight plan.

Optionally, determining RF availability in the one or more coverage areas of the communications network based on the received flight plan from the user comprises generating one or more dynamic link budgets for the flight based on the received flight plan, wherein each dynamic link budget is configured to determine RF availability of a communications link in one or more coverage areas of the communications network, generating one or more geofences based on the dynamic link budget, and determining RF availability based on the dynamic link budgets corresponding to the one or more coverage areas of the communications network that the aircraft is to fly in based on the received flight plan from the user.

Optionally, generating the one or more dynamic link budgets for the flight includes using a dynamic RF coverage prediction tool to populate one or more parameters of the one or more dynamic link budgets.

Optionally, selecting one or more RF spectrum channels from the traffic channel pool comprises determining a number of RF spectrum channels to assign to the flight based on a throughput requirement of the flight.

Optionally, selecting one or more RF spectrum channels from the traffic channel pool comprises selecting the determined number of RF spectrum channels from the available RF spectrum channels in the traffic channel pool.

Optionally, the traffic channel pool comprises one or more reserved RF spectrum channels, wherein the reserved RF spectrum channels comprise RF spectrum channels that have been already reserved by another of the communications network.

Optionally, the traffic channel pool comprises one or more restricted traffic channels, wherein the restricted RF spectrum channels comprise RF spectrum channels reserved for use.

Optionally, determining the presence of one or more interfering signals in the communications network comprises using a dynamic interference prediction tool.

Optionally, the one or more processors are caused to transmit the selected one or more RF spectrum channels to a third-party regulatory body for approval, and reserve the selected one or more RF spectrum channels for the received flight plan upon receiving approval from the regulatory body.

Optionally, the one or more processors are caused to transmit the selected one or more RF spectrum channels to a spectrum management system.

Optionally, a base station controller is configured to operate a communications link between a pilot and an aircraft used to execute the received flight plan during the flight.

Optionally, the one or more processors are caused select a modulation scheme to operate the communications link between the pilot and the aircraft.

Optionally, the one or more processors are caused to select a forward error correction code to operate the communications link between the pilot and the aircraft.

According to an aspect, a system for implementing and maintaining an RF communications link in an air-to-ground communications network includes a memory, one or more processors, wherein the memory stores one or more programs that when executed by the one or more processors, cause the one or more processors to receive information about a flight to take place in one or more coverage areas of the air-to-ground communications network, wherein the information comprises one or more RF spectrum channels associated with the flight, generate an RF communications link at a base station of the communications network between a user and an aircraft flying the flight based on the one or more RF spectrum channels associated with the flight, generate a dynamic link budget for the flight based on the received information and based on one or more conditions of the communications network, determine the presence of one or more performance degradations in the RF communications link during the flight based on the generated dynamic link budget, if one or more performance degradations are determined to be present in the RF communications link, apply one or more mitigations to the RF communications link, and update the dynamic link budget based on the applied one or more mitigations.

Optionally, the information about a flight to take place in one or more coverage areas of the air-to-ground communications network comprises timing, location, and altitude information for the flight that is to fly in the one or more coverage areas of the air-to-ground communications network.

Optionally, the information comprises information about the radio configuration of the aircraft performing the flight plan.

Optionally, generating an RF communications link at the base station between the user and the aircraft comprises transmitting data from the user to the aircraft at an RF frequency based on the one or more RF spectrum channels associated with the flight.

Optionally, generating an RF communications link at the base station between the user and the aircraft comprises selecting a modulation scheme for communications between the user and the aircraft.

Optionally, generating an RF communications link at the base station between the user and the aircraft comprises selecting a forward error correction code for communications between the user and the aircraft.

Optionally, generating a dynamic link budget for the flight based on the received information and based on one or more conditions of the communications network comprises receiving information from a base station associated with one or more RF environmental conditions at the base station.

Optionally, the information from the base station associated with the one or more RF environmental conditions at the base station is generated by a spectrum monitoring device located at the base station.

Optionally, the information from the base station associated with the one or more RF environmental conditions at the base stations is generated by a base station link monitoring tool configured to detect one or more conditions of the RF communications link between the user and the aircraft.

Optionally, the dynamic link budget is based on the information generated by the spectrum monitoring device and the base station link monitoring tool.

Optionally, the spectrum monitoring device comprises a software defined receiver configured to receive and process RF signals received at a monitoring antenna of the base station.

Optionally, the spectrum monitoring device comprises a noise floor monitoring tool configured to detect a power level of a noise floor at the base station.

Optionally, the spectrum monitoring device comprises an undesired signal detection component configured to detect RF signals that are not expected at the base station.

Optionally, the spectrum monitoring device comprises a direction and power detection component configured detect a power and direction of the RF signals that are not expected at the base station.

Optionally, applying one or more mitigations to the RF communications link comprises adjusting one or more parameters associated with the dynamic link budget.

Optionally, adjusting one or more parameters associated with the dynamic link budget comprises increasing a power of the signal transmitted by an antenna of the base station to the aircraft.

Optionally, determining the presence of one or more performance degradations in the RF communications link during the flight based on the generated dynamic link budget comprises determining the presence of one or more interference signals in the RF communications link.

Optionally, determining the presence of one or more interference signals in the RF communications link comprises determining a direction at the base station from which the one or more interference signals are propagating.

Optionally, applying one or more mitigations to the RF communications link comprises controlling a beam steering antenna to transmit a null signal in the direction from which the one or more interference signals are propagating.

According to an aspect, A non-transitory computer readable storage medium storing one or more programs for allocating RF spectrum channels in an air-to-ground communications network, for execution by one or more processors of an electronic device that when executed by the device, cause the device to receive a flight plan from a user, wherein the flight plan comprises timing, location, and altitude information for a flight that is to fly in one or more coverage areas of the air-to-ground communications network, determine RF availability in the one or more coverage areas of the communications network based on the received flight plan from the user, select one or more RF spectrum channels from a traffic channel pool based on the received flight plan, determine the presence of one or more interfering signals in the communications network based on the received flight plan the selected one or more RF spectrum channels from the traffic channel pool, and if it is determined that there are no interfering signals in the communications networks, reserve the selected one or more RF spectrum channels for the received flight plan.

Optionally, wherein the flight plan comprises information about the radio configuration of an aircraft performing the flight plan.

Optionally, the device is caused to determine a throughput requirement of the aircraft based on the received information about the radio configuration of the aircraft performing the flight plan.

Optionally, the flight plan comprises a throughput requirement of an aircraft performing the flight plan.

Optionally, determining RF availability in the one or more coverage areas of the communications network based on the received flight plan from the user comprises generating one or more dynamic link budgets for the flight based on the received flight plan, wherein each dynamic link budget is configured to determine RF availability of a communications link in one or more coverage areas of the communications network, generating one or more geofences based on the dynamic link budget, and determining RF availability based on the dynamic link budgets corresponding to the one or more coverage areas of the communications network that the aircraft is to fly in based on the received flight plan from the user.

Optionally, generating the one or more dynamic link budgets for the flight includes using a dynamic RF coverage prediction tool to populate one or more parameters of the one or more dynamic link budgets.

Optionally, selecting one or more RF spectrum channels from the traffic channel pool comprises determining a number of RF spectrum channels to assign to the flight based on a throughput requirement of the flight.

Optionally, selecting one or more RF spectrum channels from the traffic channel pool comprises selecting the determined number of RF spectrum channels from the available RF spectrum channels in the traffic channel pool.

Optionally, wherein the traffic channel pool comprises one or more reserved RF spectrum channels, wherein the reserved RF spectrum channels comprise RF spectrum channels that have been already reserved.

Optionally, the traffic channel pool comprises one or more restricted traffic channels, wherein the restricted RF spectrum channels comprise RF spectrum channels reserved for use.

Optionally, determining the presence of one or more interfering signals in the communications network comprises using a dynamic interference prediction tool.

Optionally, wherein the one or more processors are caused to transmit the selected one or more RF spectrum channels to a third-party regulatory body for approval, and reserve the selected one or more RF spectrum channels for the received flight plan upon receiving approval from the regulatory body.

Optionally, wherein the device is caused to transmit the selected one or more RF spectrum channels to a spectrum management system.

Optionally, wherein a base station controller is configured to operate a communications link between a pilot and an aircraft used to execute the received flight plan during the flight.

Optionally, the device is caused to select a modulation scheme to operate the communications link between the pilot and the aircraft.

Optionally, the device is caused to select a forward error correction code to operate the communications link between the pilot and the aircraft.

Optionally, A non-transitory computer readable storage medium storing one or more for implementing and maintaining an RF communications link in an air-to-ground communications network for allocating RF spectrum channels in an air-to-ground communications network, for execution by one or more processors of an electronic device that when executed by the device, cause the device to receive information about a flight to take place in one or more coverage areas of the air-to-ground communications network, wherein the information comprises one or more RF spectrum channels associated with the flight, generate an RF communications link at a base station of the communications network between a user and an aircraft flying the flight based on the one or more RF spectrum channels associated with the flight, generate a dynamic link budget for the flight based on the received information and based on one or more conditions of the communications network, determine the presence of one or more performance degradations in the RF communications link during the flight based on the generated dynamic link budget, if one or more performance degradations are determined to be present in the RF communications link, apply one or more mitigations to the RF communications link, and update the dynamic link budget based on the applied one or more mitigations.

Optionally, the information about a flight to take place in one or more coverage areas of the air-to-ground communications network comprises timing, location, and altitude information for the flight that is to fly in the one or more coverage areas of the air-to-ground communications network.

Optionally, the information comprises information about the radio configuration of the aircraft performing the flight plan.

Optionally, generating an RF communications link at the base station between the user and the aircraft comprises transmitting data from the user to the aircraft at an RF frequency based on the one or more RF spectrum channels associated with the flight.

Optionally, generating an RF communications link at the base station between the user and the aircraft comprises selecting a modulation scheme for communications between the user and the aircraft.

Optionally, generating an RF communications link at the base station between the user and the aircraft comprises selecting a forward error correction code for communications between the user and the aircraft.

Optionally, generating a dynamic link budget for the flight based on the received information and based on one or more conditions of the communications network comprises receiving information from a base station associated with one or more RF environmental conditions at the base station.

Optionally, the information from the base station associated with the one or more RF environmental conditions at the base station is generated by a spectrum monitoring device located at the base station.

Optionally, the information from the base station associated with the one or more RF environmental conditions at the base stations is generated by a base station link monitoring tool configured to detect one or more conditions of the RF communications link between the user and the aircraft.

Optionally, the dynamic link budget is based on the information generated by the spectrum monitoring device and the base station link monitoring tool.

Optionally, the spectrum monitoring device comprises a software defined receiver configured to receive and process RF signals received at a monitoring antenna of the base station.

Optionally, the spectrum monitoring device comprises noise floor monitoring tool configured to detect a power level of a noise floor at the base station.

Optionally, the spectrum monitoring device comprises a undesired signal detection component configured to detect RF signals that are not expected at the base station.

Optionally, the spectrum monitoring device comprises a direction and power detection component configured detect a power and direction of the RF signals that are not expected at the base station.

Optionally, applying one or more mitigations to the RF communications link comprises adjusting one or more parameters associated with the dynamic link budget.

Optionally, adjusting one or more parameters associated with the dynamic link budget comprises increasing a power of the signal transmitted by an antenna of the base station to the aircraft.

Optionally, determining the presence of one or more performance degradations in the RF communications link during the flight based on the generated dynamic link budget comprises determining the presence of one or more interference signals in the RF communications link.

Optionally, determining the presence of one or more interference signals in the RF communications link comprises determining a direction at the base station from which the one or more interference signals are propagating.

Optionally, applying one or more mitigations to the RF communications link comprises controlling a beam steering antenna to transmit a null signal in the direction from which the one or more interference signals are propagating.

BRIEF DESCRIPTION OF THE FIGURES

The invention will now be described, by way of example only, with reference to the accompanying drawings, in which.

DETAILED DESCRIPTION

Figure 1:
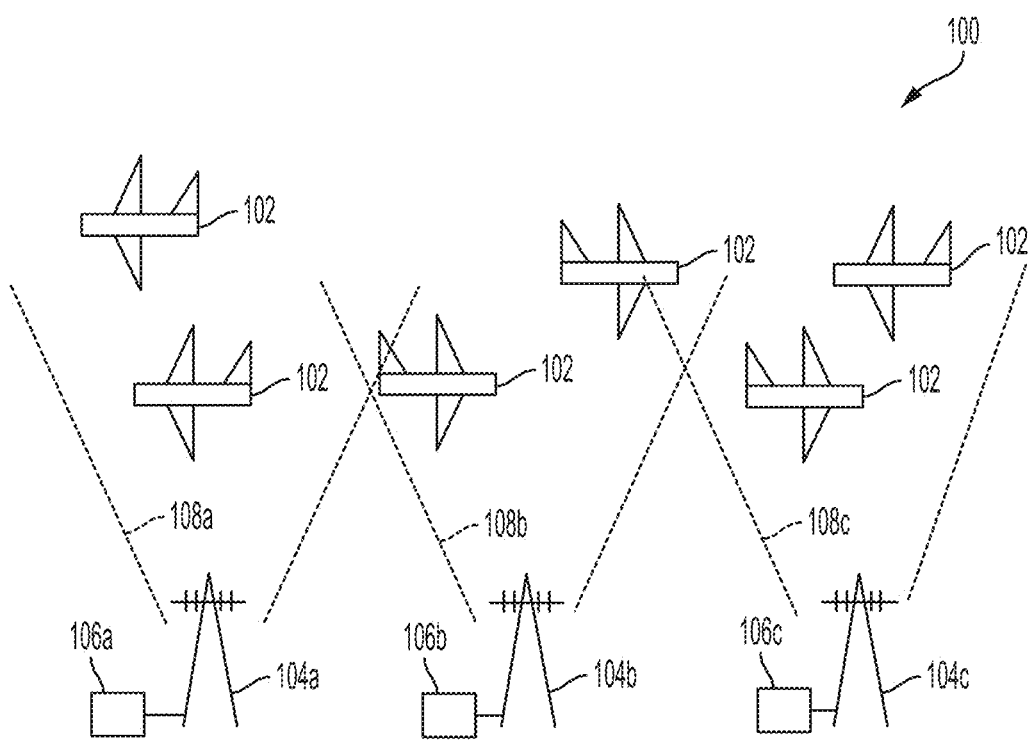
FIG. 1 illustrates a ground to air network according to examples of the disclosure.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Described herein are systems and methods for assigning and managing RF communications between ground-based stations and airborne assets. In one or more examples of the disclosure, a pilot or other user can generate and transmit a flight plan to a spectrum management system. Additionally, or alternatively, the pilot or use can also transmit additional information to the spectrum management system such as the type of aircraft/radio configuration that they will be using during a flight, and a request for a certain amount of data throughput that they want to have access to during the flight.

In one or more examples, upon receiving the flight plan and/or information from the pilot, the spectrum management system can proceed to match the user with an RF spectrum slot for the pilot to use during their planned flight. As described in further detail below, the selection of the slot for the pilot's use by the spectrum management system can be based on the information and flight plan submitted by the pilot, as well as other factors such as predictions about RF spectrum interference that may occur during the flight, RF coverage prediction, and RF spectrum availability in the geographic area or areas that the aircraft will traverse during their flight.

According to various embodiments, once the RF spectrum slot or slots has been selected for a given flight plan, the spectrum management system can also be configured to implement a communications link between the pilot/operator and the aircraft using the RF spectrum slot assigned to the aircraft and its flight plan. In one or more examples, the spectrum management system can configure the communications link between an operator and a plane by applying the chosen RF spectrum slot to a ground base station and selecting other parameters associated with the communications link.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present disclosure as described herein.

When an aircraft is in-flight, it is critical that the aircraft have a reliable and continuous communication link with the ground. For instance, in the context of unmanned aircraft vehicles (UAVs) in which an aircraft is flown and controlled from the ground by an operator, the operator will need to be continuously updated with information regarding the status of the UAV. In order to facilitate unmanned flight, UAVs must have continuous contact with operators on the ground so that they can receive instructions and also so that they can transmit vital telemetry information to let the operators know the status of the flight. However, as air traffic increases across the world, providing a reliable and continuous communications link to an aircraft for the entire duration of its flight can become a complicated endeavor. A ground-to-air communications network can include many aircraft, ground stations, and geographic areas that need to coordinated so as to ensure that a single aircraft in the network can be provided with a reliable and continuous communications channel during its flight.

FIG. 1 illustrates a ground to air network according to examples of the disclosure. The example of FIG. 1 illustrates an exemplary communications network 100 that can be configured to provide communications between one or more ground base stations 104a-c and one or more aircraft 102 in-flight. In one or more examples, the communications network 100 can include one or more ground base stations 104a-c. Each of the ground base stations 104a-c include one or more antennas configured to transmit communications from the ground to the one or more aircraft 102. In one or more examples, each ground base station 104a-c can be configured to provide transmissions within a coverage area 108a-c. For example, ground base station 104a can be configured to transmit RF spectrum radio signals over geographic coverage area 108a. Ground base station 104b can be configured to transmit RF spectrum radio signals over geographic coverage area 108b, and ground base station 104c can be configured to transmit RF spectrum radio signals over geographic coverage area 108c. In one or more examples, geographic coverage areas 108a-c can be three-dimensional areas that not only cover a certain range of latitude and longitude, but also provide coverage to areas from the ground up until a maximum serviceable altitude.

In one or more examples, each aircraft 102 can be handed over from one ground base station to the next during the duration of its flight. For instance, at the beginning of a flight, ground base station 104a can be responsible for providing a communications channel between an operator on the ground and the aircraft while the aircraft 102 is within the coverage area 108a. If during the flight, the aircraft transits out of the coverage area 108a into coverage area 108b, then responsibility for providing the communications channel can transition from ground base station 104a to ground station 104b. If during the flight, the aircraft 102 transits out of coverage area 108b into coverage area 108c, then responsibility for providing the communications channel can transition from ground base station 104b to ground station 104c. In this way, the communications network 100 can be configured to ensure that an aircraft has an established communications channel with at least one ground base station at any point along its flight plan, so long as the flight plan passes through at least one coverage area at any point during its flight.

In one or more examples, each base station 104a-c can be communicatively coupled to a base station controller 106a-c respectively. Thus, in one or more examples, ground base station 104a can be communicatively coupled to base station controller 106a, ground base station 104b can be communicatively coupled to base station controller 106b, and ground base station 104c can be communicatively coupled to base station controller 106c. As described in further detail below, each base station controller can be configured to implement an RF based communications channel between a ground operator and an aircraft 102 when the aircraft is transiting through the coverage area 108a-c that corresponds to the base station that the controller is configured to operate. In one or more examples, implementing an RF based communications channel can include modulating signals transmitted by the operator to a RF spectrum frequency assigned to the aircraft 102, applying an appropriate modulation scheme to the transmitted signals, and applying any other physical layer communications protocols such as error correction codes.

In one or more examples, the goal of the communications network 100 can be to provide any given aircraft 102 operating within the network with a continuous and reliable RF spectrum channel throughout the duration of its flight. In one or more examples, providing a continuous and reliable RF spectrum to an aircraft can include providing a single RF spectrum channel (i.e., slot) to an aircraft that it can reliably use throughout the duration of its flight to communicate with the ground. In one or more examples, each aircraft in a given airspace can communicate with the ground using a dedicated RF spectrum channel (i.e., a frequency range in the RF spectrum that is unique to the aircraft and can be only used by that individual aircraft to transmit and receive communications from the ground). In order to facilitate efficient flight operations, in one or more examples, each ground base station 104a-c coupled to its corresponding base station controller 106a-c can be configured to ensure that each aircraft in its coverage area 108a-c is able to communicate with the ground using communications transmitted in the RF spectrum channel assigned to that aircraft.

Assigning aircraft a dedicated RF spectrum channel to use throughout the duration of its flight can be difficult. Often times a given base station is responsible for providing communications channels to hundreds of flights at any given moment in time, with each aircraft in the coverage needing its own dedicated RF spectrum channel so that it can communicate with the ground uninterrupted by other air traffic in the air space. Furthermore, since flights can traverse multiple base stations during a given flight, assigning a dedicated RF spectrum to a flight that can be used throughout the flights duration to have non-contended communications with the ground can require a high level of coordination to ensure that no two aircraft transit the same coverage area using the same RF spectrum channel. Furthermore, as the RF environment in a given coverage area is dynamic, not only is there a need to make sure that no two flights in a given coverage area operate on the same RF channel, but there is also a need to make sure that any communications between an aircraft and the ground will not be interfered with from various noise sources that can operate in a given coverage area. These noise sources can include the RF Noise Floor, related or unrelated network Co-Channel or Adjacent Channel Interference as well as Out of Band Interference sources.

In order to coordinate the assignment of RF spectrum channels to aircraft, in one or more examples, a system for Dynamic Spectrum Management that is configured to support safe aviation operations can be implemented to coordinate RF spectrum channel allocation to aircraft operating in a given communications network. In one or more examples, the spectrum management system can allocate the spectrum and traffic channels in a deterministic way to ensure the radio resources are available between the ground base station and the airborne radios operating on aircraft in the network.

Figure 2:
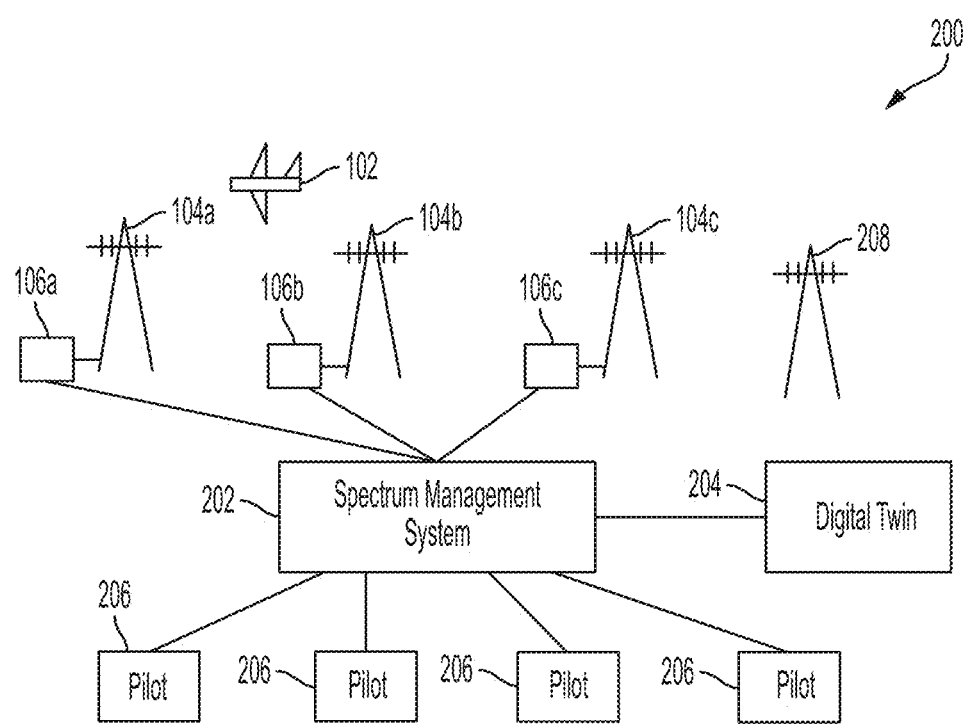
FIG. 2 illustrates an exemplary system for RF spectrum management of ground to air communication networks according to examples of the disclosure.

FIG. 2 illustrates an exemplary system for RF spectrum management of ground to air communication networks according to examples of the disclosure. In one or more examples of the disclosure, the communications network 200 of FIG. 2 can include the same components (i.e., aircraft 102, ground base stations 104a-c, and base station controller 106a-c) as the communications network 100 described above with respect to FIG. 1, but can also include one or more spectrum management system components (described in further detail below) that can manage the process of allocating RF spectrum channels to aircraft 102 in the network 200.

In one or more examples of the disclosure, one or more pilots/operators 206 can be connected to the network 200 in order to transmit data (such as command and control data) to the one or more aircraft. Each of the pilots 206 can be communicatively coupled to the network 200 through a spectrum management system 202 that can be configured to allocate RF spectrum channels to each of the aircraft 102 being controlled by the pilots 206. In one or more examples, the spectrum management system 202 can be configured to facilitate a communications link between each pilot 206 and their corresponding aircraft 102 by establishing an RF communications link using a specified RF spectrum channel allocated to each aircraft.

In one or more examples of the disclosure, the spectrum management system can be configured to manage each communication link between an aircraft 102 and a pilot/operator 206 in real-time. Thus, in one or more examples, if the spectrum management system 202 determines that a given communications link has been compromised or had degraded, the spectrum management system 202 can take action to adjust the communications link to mitigate the issue. For instance, in one or more examples, if a given RF spectrum channel being used by an aircraft 102 is no longer performing satisfactorily or to required specifications, the spectrum channel management system 202 can change the RF spectrum channel (described in detail below) to an alternative available channel in real-time to ensure that each aircraft maintains a reliable RF communications link. In one or more examples, if the pilot deviates from their advertised flight plan (for example by flying longer than anticipated) the spectrum management system 202 can be configured to take action (for instance by switching the RF channel) to ensure that any interruptions to the communications channel are mitigated.

In one or more examples of the disclosure, in addition to managing communication channels in real-time, the spectrum management system 202 can be configured to allocate and reserve one or more RF channels for a given flight to be used during the duration of the flight. As described in further detail below, the spectrum management system 202 can receive a flight plan from a pilot/operator 206 and based on the filed flight plan as well as other factors can allocate an RF channels to each flight in a deterministic manner that takes into account potential interference that may be encountered during the flight.

In one or more examples, and addition to assigning traffic channels to aircraft for communications with the ground, the spectrum management system 202 can also be configured to assign traffic channels to one or more ground base stations for the purpose broadcast/multi-case services that airborne radios in communication with the ground base station can utilize to gain access to services such as aircraft altimeter updates, enhanced GPS (RTK), and other aviation related services. In one or more examples, the spectrum management system 202 can also assign traffic channels to be allocated to the ground based station for dynamic allocation for on-demand request or traffic channels from airborne radios that are in communication with the ground based station but in idle mode on the ground station control channel. Examples of the use of these channels include aircraft that are operation on other networks (i.e., cellular, satellite, or other public/private terrestrial networks) that are looking to transition for such a service to another aviation network. In one or more examples, in order to facilitate the transition, the ground base station can dynamically allocate the sub-channel at the request of the pilot to the real-time spectrum management system 202 and the ground base station. Once assigned the traffic channel, the aircraft will continue flight operation on the allocated channel until the flight operation is complete or the channel is no longer needed (i.e., the aircraft has obtained service from another ground base station or other service provider). Once the channel is no longer needed, in one or more examples, the channel dynamically allocated to the aircraft can be returned to the dynamically allocated traffic channel pool for future dynamic assignment to another aircraft needing a dynamically allocated channel. In one or more examples, in the case of a dynamically allocated traffic channel as described above, the spectrum management system 202 can be aware of the flight plan filed for a given aircraft assigned a dynamic channel, even though the flight plan may be served by another network. In one or more example, the spectrum management system 202 can be aware of the location of the airborne radio of an aircraft through connectivity along a control channel that can continually monitor the location of the aircraft while continuously updating the spectrum management system 202, as well as the beam forming antenna system both of which are prepared to provide a traffic channel upon request.

In one or more examples, the spectrum allocation process described above can be implemented by the spectrum management system 202, or can be processed in a separate component referred to herein as a "digital twin." Due to the large volume of information and the potential for spectrum and/or traffic channel requests by tens of thousands of end users in the a given airspace, a digital twin of the spectrum management system can be used to perform the required analysis without impacting the operational system. In one or more examples, and as illustrated in the example of FIG. 2, the digital twin 204 can be implemented separately from the spectrum management system 202 so as to reduce the processing load of the spectrum management system 202, thus leaving it free to perform the real-time operations associated with managing the active communications channels of aircraft transiting the airspace managed by the spectrum management system 202. Alternatively, the digital twin 204 can also be implemented as part of the spectrum management system such that both the real-time management of air communication links, and flight planning are performed by the same component.

In one or more examples, the digital twin 204 can be configured to receive one or more requests from the pilots 206 for spectrum to use during a given flight plan. The digital twin, using the flight plan provided by the pilot as well as other factors (described below) can determine what RF spectrum channels to allocate to an aircraft when its flight commences. Once requests are confirmed in the digital twin 204, execution and assignment of the communications channel on the operational spectrum management system 202 can be performed.

As described above, the spectrum management system 202 and the digital twin 204 can coordinate the RF spectrum needs of multiple aircraft in a given communications network so as to ensure that each individual aircraft can have access to a reliable and continuous communications channel with the ground during the entirety of its flight. In one or more examples, the spectrum management system 202 and the digital twin 204 can work in tandem to allocate and reserve RF spectrum channels for individual aircraft, and as described below, can monitor each individual communications link in-flight to ensure that the communications link is operating to its requirement.

Selecting an RF channel to allocate to a given flight can involve analyzing multiple variables to ensure that the selected channel will service the needs of an aircraft throughout the duration of its flight. In one or more examples, the spectrum management system 202 and the digital twin can analyze several variables such as the available spectrum resources, radio link throughput and performance requirements, location (including elevation), time-period as well as the radio frequency environment to assign a non-contended resource between the pilot and the aircraft. In one or more examples, the variables that influence channel selection can be populated by several internal and external components to the spectrum management system 202 that work together to match an aircraft to one or more RF channels for use during a flight as described below.

In one or more examples, the digital twin may use machine learning and/or predictive analytics to enhance its performance. In one or more examples, the digital twin may use machine learning and/or predictive analytics to predict the performance of aircrafts given the influence of external factors. The external factors may include weather, airspeed, barometric pressure, and/or other factors that may impact flight performance and thus the predictability of the network. In one or more examples, the digital twin may use machine learning and/or predictive analytics to predict network interference based on external factors or flight performance.

In one or more examples, each pilot in the communications network can interface with the communications network before and during their flight via the spectrum management system 202 and the digital twin 204. Before the flight, and as described below, the pilot can interface with the spectrum management system and digital twin to receive an RF spectrum channel allocation for use during their flight based on their filed flight plan and other variables. During the flight, the spectrum management system 202 can provision the allocated RF spectrum channel to both the aircraft and the pilot to establish a continuous communications link and the spectrum management system can monitor the link during the flight to make sure it is performing within specification.

In one or more examples of the disclosure, the network 200 can include one or more base stations that are not connected to the spectrum management system 202. In one or more examples, a service provider who provides and maintains access to the spectrum management system 202 may not provide coverage to every desired geographic location. In one or more examples, in areas where a pilot may want to operate a flight but that does not fall within a coverage area of an existing base station, the service provider can provide the pilot with a temporary or portable base station 208. In one or more examples, the temporary/portable base station may not have a connection with the spectrum management system 202 and thus cannot receive/transmit information to the spectrum management system for the purposes of provisioning RF channels to aircraft.

In one or more examples, the temporary/portable base station 208 can be used to setup point-to-point and multi-point links between the temporary/portable base station 208 and one or more aircrafts radios for flight operation. In one or more examples of the disclosure, the operator of a temporary/portable base station 208 the operators can inform the service provider a "concept of operation" of the base station 208 that describes the number of aircraft, the times they will fly and the spectrum they will use to communicate with the aircraft. While the spectrum monitoring system 202 may not send real-time information to the temporary/portable base station 208, the spectrum management system 202 can use the concept of operation of the temporary/portable base station 208 to update the geofences (described in detail below) of the base stations 106a-c that are connected to the network and can work to ensure that flights that are flying within its network 200 do not cause interference with the flight operations of the temporary/portable base station 208. In one or more examples, the spectrum management system 202 can notify the operators of flights transiting the network 200 about the physical limitations to their operations caused by the temporary/portable base station 208 and can factor in the operations of the temporary/portable base station 208 when making RF spectrum slot allocations. In this way, while the spectrum management system 202 may not coordinate the operations of the temporary/portable base station 208, it can work to protect its own network (i.e., the base stations that are connected to the spectrum management system) from the operations of the temporary/portable base station's point-to-point operations.

Figure 3:
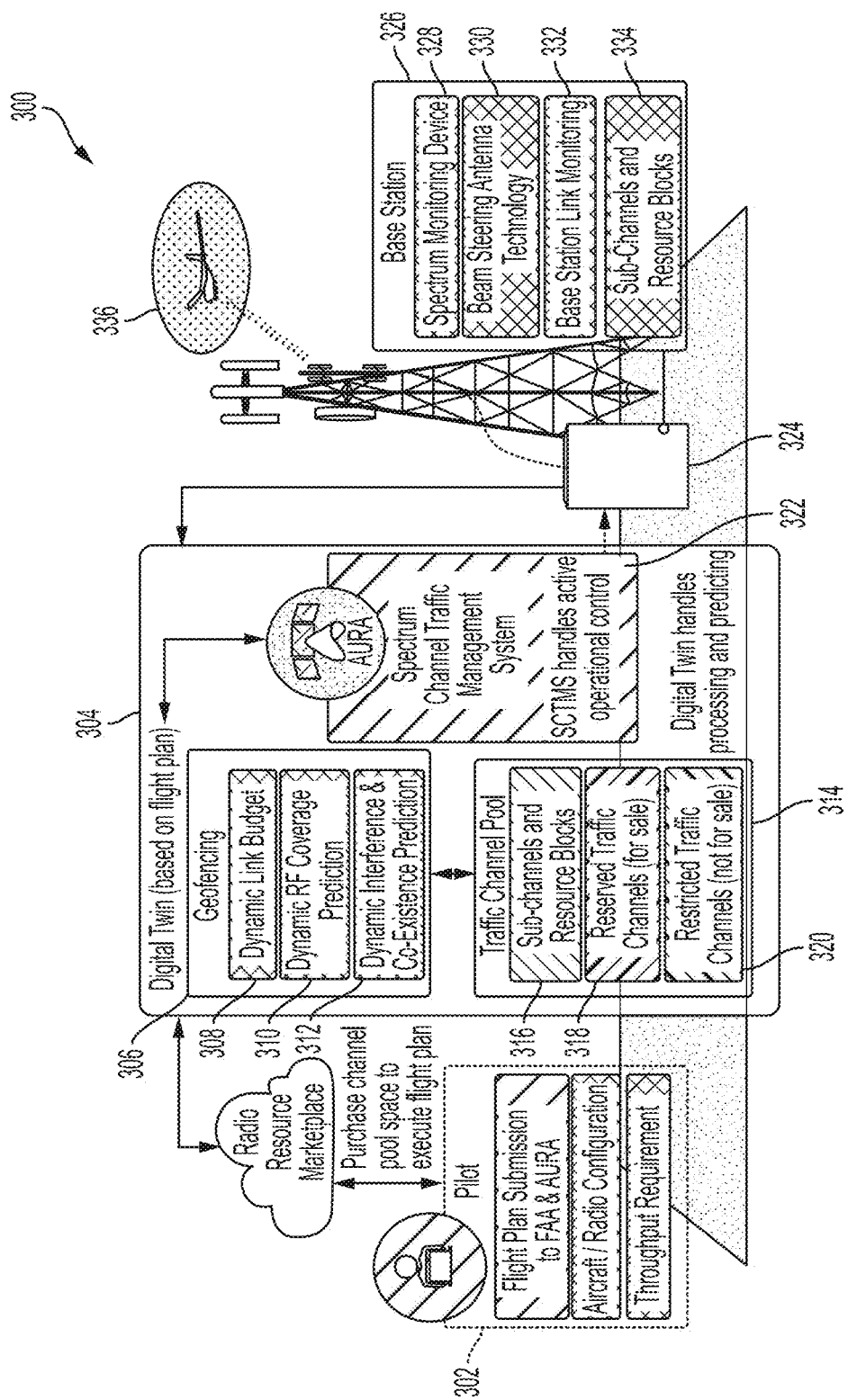
FIG. 3 illustrates an exemplary system for RF spectrum allocation and management according to examples of the disclosure.

FIG. 3 illustrates an exemplary system for RF spectrum allocation and management according to examples of the disclosure. In one or more examples, the system 300 can represent a single link of a communications network shown in FIGS. 1-2, and includes the components that manage the link between a pilot/end user 302 and an aircraft 336. In one or more examples of the disclosure, the planning, creation, and operation of the link between the pilot 302 and the aircraft 336 can begin with the pilot 302 submitting information about their proposed flight to the digital twin 304. In one or more examples, and as shown in FIG. 3, the information transmitted by the pilot 302 to the digital twin 304 can include a flight plan, an aircraft/radio configuration, and a throughput requirement.

In one or more examples, the flight plan submitted by the pilot 302 can include flight mission details such as the intended timing, altitude, location, and speed of the aircraft during a proposed flight. In one or more examples, the pilot 302 can submit the flight plan to both a regulatory body (such as the Federal Aviation Administration (FAA)) for approval and additionally send the flight plan to the spectrum management system via the digital twin 304 for the purpose of obtaining one or RF spectrum channels for use during the proposed flight. In addition to the flight plan, the pilot 302 can send additional information to the digital twin 304 that the digital twin can use to select and allocate a RF spectrum channel to the user. For instance, in one or more examples, the pilot 304 can transmit the configuration of the aircraft or radio so as to inform the digital twin 304 as to the type of radio that the pilot will be communicating with during the flight. Knowledge of the radio configuration can allow for the digital twin 304 to not only understand the spectrum needs of the aircraft but can also allow for the digital twin to determine and predict other necessary information about the communications channel such as the modulation scheme and the forward error correction code that will be active in-flight.

In one or more examples of the disclosure, the pilot 302 can also transmit a throughput requirement to the digital twin 304. In one or more examples, the throughput requirement can represent the amount of data that is needed to be sent and received over the communications link. In one or more examples, the throughput can either be specified by the pilot 302 or can be derived based on the aircraft/radio configuration submitted by the pilot. For instance, in one or more examples, a particular aircraft (such as a UAV) may need a certain throughput of data for the channel to properly operate its autopilot features and thus by knowing the aircraft type, the system can derive the throughput requirements for that flight. As described in detail below, the throughput requirement can be used to determine the total amount of bandwidth for an RF spectrum channel and can thus inform the selection of a channel or channels that has an effective bandwidth to accommodate the throughput requirements of the flight.

As described above, the digital twin 104 can use the flight plan and other information transmitted to it by the pilot 302 as well as other information to select one or more RF spectrum channels for use by the pilot 302 during their flight. In one or more examples, the digital twin 104 can access a traffic channel pool 314 to determine the availability of RF spectrum channels to service a given flight. In one or more examples, the traffic channel pool 314 can represent all of the RF spectrum channels that could possibly be used to service a given flight. However, since there can be multiple aircraft in the network at any given time, and the need to reserve certain channels for emergency purposes (described in detail below), not every channel in the traffic channel pool 314 may be available for use by a particular aircraft during the times and locations required by a flight based on its flight plan.

Figure 4A:
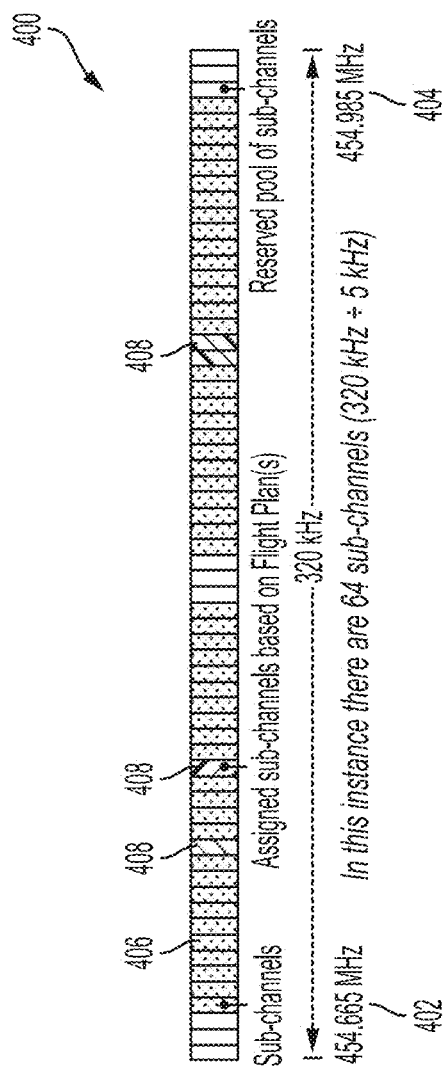
FIG. 4A illustrates an exemplary traffic channel pool according to examples of the disclosure.

FIG. 4A illustrates an exemplary traffic channel pool according to examples of the disclosure. In one or more examples the traffic channel pool 400 can include a minimum frequency 402 and a maximum frequency 404. The total range between the minimum frequency 402 and the maximum 404 can represent the total RF spectrum range of the network. In the example of FIG. 4A, the minimum frequency is shown as 454.665 MHz while the maximum frequency 404 is shown as 454.985 MHz meaning that the total RF spectrum range is 320 kHz. Each and every flight operated by the communications network, must thus be allocated a channel within the 320 kHz frequency spectrum range. The frequency values shown in the example of FIG. 4A are meant as examples only and should not be seen as limiting to the disclosure.

In one or more examples, the RF spectrum range created by the minimum frequency 402 and the maximum frequency 404 can be subdivided into one or more channels 406. Each channel 406 can represent the smallest sub-portion of the RF spectrum range that can be allocated to an individual user. In the example of FIG. 4A, the RF spectrum range of 320 kHz can be divided in 64 individual channels, with each channel represent a 5 kHz range. In one or more examples, the amount of channels that a flight needs for its intended flight plan can be based on the throughput requirements defined by the user as described above. For instance, in one or more examples, if a user requires a bandwidth that is greater than what 5 kHz can serve, then the system can allocate multiple channels 406 to service the flight. For instance, if a flight needed 15 kHz of bandwidth based on its throughput requirements, then the system can allocate three adjacent or non-adjacent 5 kHz channels in the traffic channel pool 400 so that the flight can have a bandwidth allocation commensurate with its throughput requirements. The channel sizes and frequencies described above and throughout the application are meant as examples only and should not be construed as limiting as the techniques described throughout can be applied to different frequencies and channel sizes and still fall within the scope of the disclosure.

As described above, given that there may be multiple flights operating on a network at any given time, not every channel in the RF spectrum range of the traffic channel pool 400 may be available to a given flight plan. Using the example of FIG. 4A, one or more channels 408 may have already been previously allocated to other flight plans and thus may be unavailable for allocation to a given user when deciding which channels to allocate. Additionally, in one or more examples, certain reserved channels 410 may be reserved for emergency uses and thus unavailable for allocation. For example, if during a flight a channel's performance degrades due to unforeseen circumstances, then the system may switch the flight from its allocated channel/channels to one of the reserved channels 408 so that it can maintain a reliable communication link with the ground. In one or more examples, the traffic channel pool 400 can include one or more restricted channels (not pictured) that cannot be used by the system because use of those signals is prohibited by various standards and rules that may be imposed by a regulatory authority. In one or more examples, the traffic channel pool 400 one or more channels that are designated as "in use" because the particular channel is either being used by a currently operating flight plan, or will be in use by another flight plan at the time that the current flight being planned will be in operation. In one or more examples, the traffic channel pool 400 can be designated as a "dynamically assigned" channel. As described above, a dynamically assigned channel can be allocated to the ground based station for dynamic allocation to aircraft to communicate with the ground based station even though the flight may not be actively using the network that the ground based station is operating on. Examples of the use of these channels include aircraft that are operation on other networks (i.e., cellular, satellite, or other public/private terrestrial networks) that are looking to transition for such a service to another aviation network. In one or more examples, in order to facilitate the transition, the ground base station can dynamically allocate the sub-channel at the request of the pilot to the real-time spectrum management system 202 and the ground base station. Once assigned the traffic channel, the aircraft will continue flight operation on the allocated channel until the flight operation is complete or the channel is no longer needed (i.e., the aircraft has obtained service from another ground base station or other service provider). Once the channel is no longer needed, in one or more examples, the channel dynamically allocated to the aircraft can be returned to the dynamically allocated traffic channel pool for future dynamic assignment to another aircraft needing a dynamically allocated channel. In one or more examples, in the case of a dynamically allocated traffic channel as described above, the spectrum management system 202 can be aware of the flight plan filed for a given aircraft assigned a dynamic channel, even though the flight plan may be served by another network. In one or more example, the spectrum management system 202 can be aware of the location of the airborne radio of an aircraft through connectivity along a control channel that can continually monitor the location of the aircraft while continuously updating the spectrum management system 202, as well as the beam forming antenna system both of which are prepared to provide a traffic channel upon request. Thus, in one or more examples, the traffic channel pool 400 can have one more "dynamically assigned" channels that are reserved for use in the scenarios described above, and thus may not be available to be used for a flight that operating in the network.

Figure 4B:
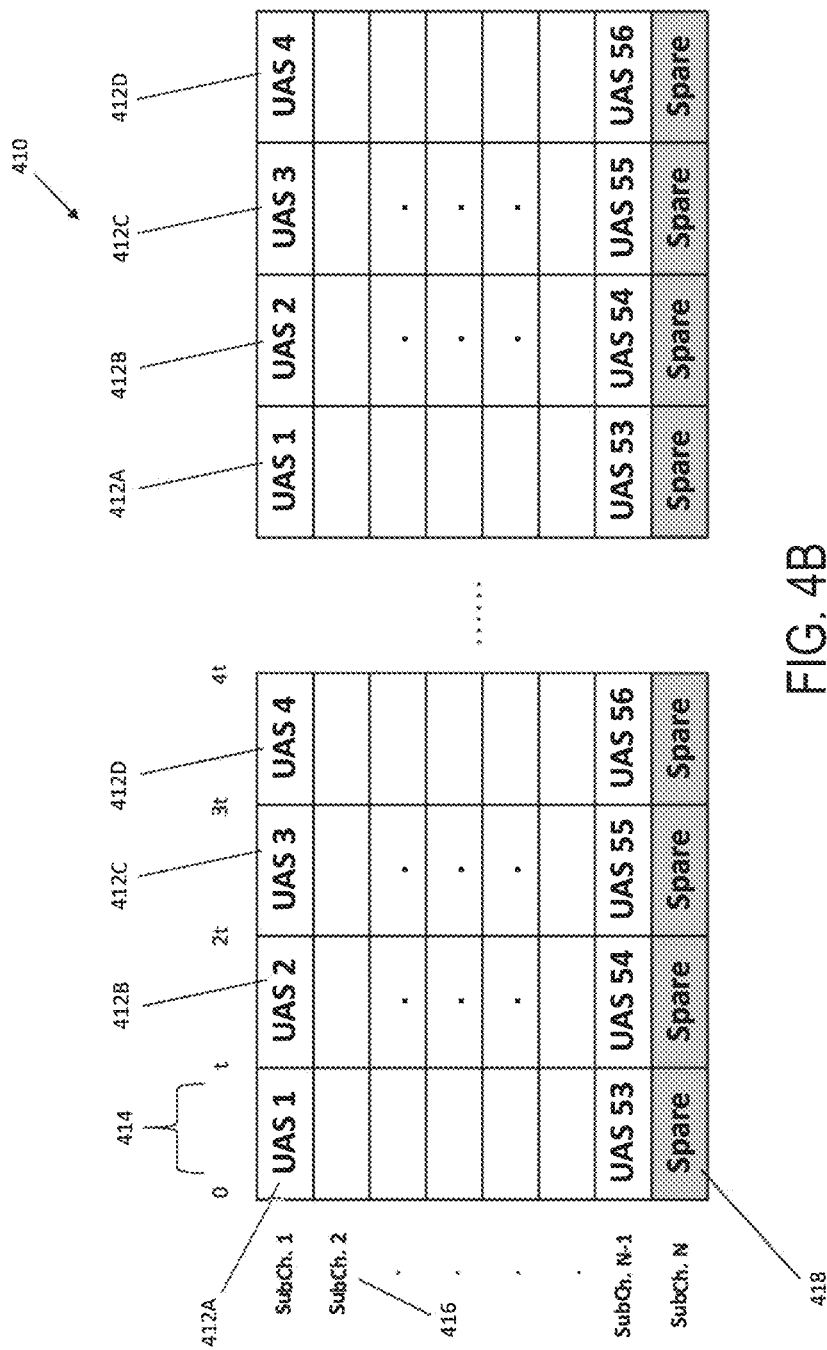
FIG. 4B illustrates another exemplary traffic channel pool according to examples of the disclosure.

The example of FIG. 4A described above provides an example of a traffic channel pool wherein each aircraft is assigned its own dedicated traffic channel for use to carry communications between a pilot and the UAS during a flight. However, this example should not be seen as limiting. For instance, in one or more examples, rather than assigning each UAS its own traffic channel, multiple UAS can share a single channel for instance by time multiplexing a channel amongst a plurality of UAS. FIG. 4B illustrates another exemplary traffic channel pool according to examples of the disclosure. In one or more examples, the traffic channel 410 can include multiple sub-channels 416 similar to the example of FIG. 4A and specifically channel 406 of FIG. 4A.

However, in contrast to the example of FIG. 4A, rather than assigning each UAS assigned to a base station its own individual channel, in one or more examples, multiple UAS can be assigned to the same channel 416. For instance, in one or more examples, and as illustrated in the example traffic channel pool 416 of FIG. 4B, multiple UAS can share a single sub-channel 416 using a system in which the communications of each UAS assigned to the same sub-channel is time multiplexed. For instance, in one or more examples, a particular sub-channel 416 can have a pre-defined plurality of time slots.

Looking at the example of FIG. 4B, in one or more examples, a sub-channel 416 can be divided into multiple time slots 414. In one or more examples, multiple UAS assigned to the same channel can transmit data during a time slot/slots allotted to them during a specific time. For instance, a sub-channel 416 (labeled SubCh 1, can be assigned to four different aircraft (UAS1-UAS4). In one or more examples, each aircraft can be assigned to a certain number of slots for a given sub-channel, for instance UAS1 can be assigned slots 412A, UAS2 can be assigned slots 412B, UAS3 can be assigned slots 412C, and UAS4 can be assigned slots 412D. In one or more examples, each slot can be configured such that each UAS transmits once before any of the UAS assigned to a given sub-channel transmits for a second time in a given frame. In this way, each UAS assigned to a given sub-channel can transmit data within a given slot. For instance, UAS1-UAS4 can transmit data in a round-robin configuration such that each UAS1-UAS4 transmits during a slot before any of the UAS assigned to the channel transmits data during a second time slot.

In one or more examples, the size of a frame within a slot, and the size of the slots can be pre-defined. For instance, in one or more examples, the size of the frame can be pre-determined so as to optimize the balance between having a large frame that can improve channel performance (for instance to improve forward error correction (FEC) performance), and a small frame size that minimizes channel latency. In one or more examples, the frame size can also be determined by the hardware on either end of a communications channel. For instance, if a radio uses a frame size of 20 ms, then the frame size of the traffic channel pool 416 can be set to an integer multiple of the frame size of the radio (i.e., 80 ms). In one or more examples, the frame size and length of a time slot can be configurable by the user to meet the communication needs of the entity assigned to the slot. The example of FIG. 4B can thus allow for 4× the amount of UAS to use the traffic channel pool 410 in contrast with an example in which each sub-channel of the traffic channel pool is dedicated to a single aircraft. Similar to the example of FIG. 4A, one or more sub-channels 418 can be reserved (i.e., not assigned to any aircraft) to be kept in case of emergencies or for other reserved uses described above with respect to FIG. 4A. Furthermore, similar to the example of FIG. 4A, one or more sub-channels can also be assigned to a single UAS, while another sub-channel can be shared by multiple UAS.

In one or more examples, the traffic channel pool 416 of FIG. 4B can represent a forward slot structure associated with transmissions from the ground to the aircraft. In one or more examples, the return slot structure (i.e., transmissions from the aircraft to the ground) can be almost identical to the forward frame structure except the return traffic associated with a particular aircraft can be allocated a different time slot than the time slot allocated to the aircraft in the forward frame in order to allow for half-duplex operation of the aircraft's radio. In one or more examples, the return slots can also be placed into a different RF sub-channel than the forward slots In one or more examples, allowing a single RF channel to be divided in time by multiple aircraft can lead to increased spectral efficiency by allowing more aircraft to use the RF sub-channels of the traffic channel pool than if a single aircraft were assigned to its own dedicated RF sub-channel.

Returning to the example of FIG. 3, the digital twin 304 can select a channel or channels from the traffic channel pool 314, which as described above can include available sub-channels 316, reserved channels 318, and restricted traffic channels 320. However, in one or more examples, simply selecting an available sub-channel or channels for allocation may not mean that a communication link using that channel will be reliable throughout a flight. Various factors such as the predicted RF environment experienced during a flight or predicted interference can cause a given channel to fail during a flight. Thus, as part of the allocation process, the digital twin 304 can also perform an analysis to ensure that the channel will be available and perform to requirements throughout the duration of the flight as described below.

In order to allocate an RF channel to an aircraft, the digital twin 304, in one or more examples, can first determine if RF coverage is available for the aircraft during the entirety of its flight. To do so, in one or more examples, the digital twin 104 of the spectrum management system can "geofence" the coverage areas of each of the ground based stations in the network as shown at 306. In one or more examples, a "geofence" 306 can refer to a zone within a coverage area in which there is sufficient RF availability for flight traffic. In one or more examples, when a pilot 302 submits a flight plan, the system can query the geofences 306 to make sure there is RF availability throughout the path of the plan and at all altitudes expressed in the flight plan. In one or more examples of the disclosure, geofences can be shared with the pilot/operator of a flight and can be programmed into the auto-pilot of an aerial vehicle for use during a flight.

In one or more examples, a geofence can be created using a dynamic link budget 308 that is maintained by the digital twin 304. In one or more examples, each geofence 306 can have its own dynamic link budget 308. The dynamic link budget 308 can determine what the RF availability of a given geofence is at any particular moment in time, and can even predict RF availability for a given geofence in the future based on various parameters. In one or more examples, the dynamic link budget 308 can include such parameters as antenna gain, RF losses, receiver sensitivity, power, frequency, spectrum bandwidth, traffic channel size/quantities (i.e., sub-channels, resource blocks), quality of service (QOS) requirements, modulation, spectrum monitoring system results (described in further detail below) and the location of any known co-channel interferers. The dynamic link budget 308 can also include an RF safety margin to ensure a reliable communications signal in the geofence 306. In one or more examples, the operational spectrum management system 322 (described in detail below) can maintain a real-time version of the link budget that changes based on changing conditions in the RF environment. In one or more examples, the digital twin 304 can maintain a model of the link budget, and that dynamic link budget 308 can be used to predict RF conditions at a future time based on the times implicated by a given flight path. In one or more examples, the dynamic link budgets for each geofence can be validated using measurements of RF spectrum activity at each of the base stations in the area to ensure that the dynamic link budgets include the most up-to-date information and accurately reflect the RF environments that the dynamic link budgets are meant to model. In one or more examples, each geofence can be configured to predict coverage based upon components of the flight plans presented to the spectrum management system, the spectrum monitoring systems employed at each base states, the capabilities of the beam/null forming antennas at each base station and/or satellite, as well as the known locations of other airborne radios. In one or more examples, the actual performance of radio links created at the base stations can be monitored and the information sent to the spectrum managements system for validation and modification of the geofences.

In one or more examples, and as part of the process of allocating RF spectrum channels to an aircraft, the digital twin 104 can cross reference the dynamic link budget with a calibrated RF coverage prediction tool 310. In one or more examples, the RF coverage prediction tool 310 uses appropriate RF prediction models, morphology, topology, antenna pattern characteristics, and antenna elevations to create the dynamic geofence coverage area based upon the remote radio configuration and user requirements. In one or more examples, the RF coverage prediction tool 310 may use machine learning and/or predictive analytics to create the dynamic geofence coverage area. In one or more examples, the RF coverage prediction tool 310 can be used to generate a dynamic link budget for each geofence coverage area that a flight will transit based on its filed flight plan. In one or more examples, if it is determined via the dynamic link budget/budgets that a given flight plan may not be able to sustain a reliable communications channel throughout its flight, then the pilot 302 can be notified that their flight plan must be altered in order to give the aircraft 336 and pilot 302 the communications channel needed for the duration the flight. In one or more examples, if it is determined that the flight plan is serviceable, then in one or more examples of the disclosure, the specific RF spectrum channel or channels allocated to the flight from the traffic channel pool can be cross-referenced against a dynamic interference and co-existence prediction tool 312 ("interference tool") to determine if the particular frequency allocated to the flight as described above has the potential to interfere or be interfered with by another flight in the network. In one or more examples, the interference tool 312 can be configured to calculate known co-channel interferences that may occur during a flight. In one or more examples, co-channel interference can be caused by other remote radios operating in the network that can be distributed geographically and in altitude across the geographic coverage areas that a given flight will transit based on its flight plan. If it is determined that a co-channel interference could render a given channel allocation, then in or more examples, the digital twin 304 can select another channel or channels from the traffic channel pool and analyze the allocated channel using the interference tool 312 to determine if the channel will be reliable and available throughout the flight plan as transmitted by the pilot 302. In one or more examples, the spectrum management system can use the interference tool 312 to set one or more exclusion zones (i.e., where aircraft are not allowed to fly). Additionally, the spectrum management system can set one or more exclusion zones based on various regulatory requirements, interference, point-to-point operations, and alternative technology operations including satellite or terrestrial communications networks.

In one or more examples, the spectrum management system may determine the handover points between each geofence coverage area that is involved in the course of a flight. In one or more examples, a handover point can refer to a time or location at which transmission to/from an aircraft is transferred from one base station or satellite to another base station or satellite without the aircraft losing connectivity. The location and elevation of the handover points may be calculated by the RF coverage prediction tool 310 before a flight. In one or more examples, the information related to the predicted handover points may be made known to the pilot before the flight. The pilot may use the information related to the predicted handover points to assist in the process of determining exclusion zones, clearing conflicts in resource allocations, and configuring the equipment and antenna systems in the related geofence coverage areas. In one or more examples, the information related to the predicted handover points may be programmed into the autopilots such that the aircraft and the pilots are made aware of the handover activity before the completion of the flight.

Thus, as described above, the dynamic link budget 308 (in conjunction with the dynamic RF coverage prediction tool 310) can be configured to determine if a given flight plan will have RF coverage at all points and times during the flight plan, while the interference tool 312 can be configured to ensure that the channel allocated from the traffic channel pool 314 will not be subject to a harmful amount of interference during the flight.

In one or more examples, the spectrum management system may interact with other spectrum management systems to form a network of networks to service a specific flight plan. In one or more examples, the coordination of multiple spectrum management systems may be performed by an airspace integrator. The airspace integrator may allow multiple spectrum management systems to work efficiently together to solve the coverage requirements of a flight plan when coverage with one specific wireless service with a specific spectrum management system is unable to meet the needs of the requested flight plan. In one or more examples, the airspace integrator may include information from global stakeholders (e.g., air traffic regulators, military flight operators, aerospace administrators, etc.), weather services, civil rules related to countries' aviation spaces, and unmanned traffic management systems. The airspace integrator may use the integrated information to allocate physical space for aircrafts, as well as assist the wireless network operators with their spectrum management systems to ensure predictable flight performances based on submitted flight plans. A detailed description of an exemplary airspace integrator is provided further below.

As described above, if the network of networks, dynamic link budget 308, or the interference tool 312 determine that a reliable RF link cannot be established during the flight, or that a channel that meets the needs of the flight plan is not available during the proposed time of the flight, then in one or more examples, the digital twin 304 can inform the pilot 302 that the flight plan needs to be adjusted.

Figure 5:
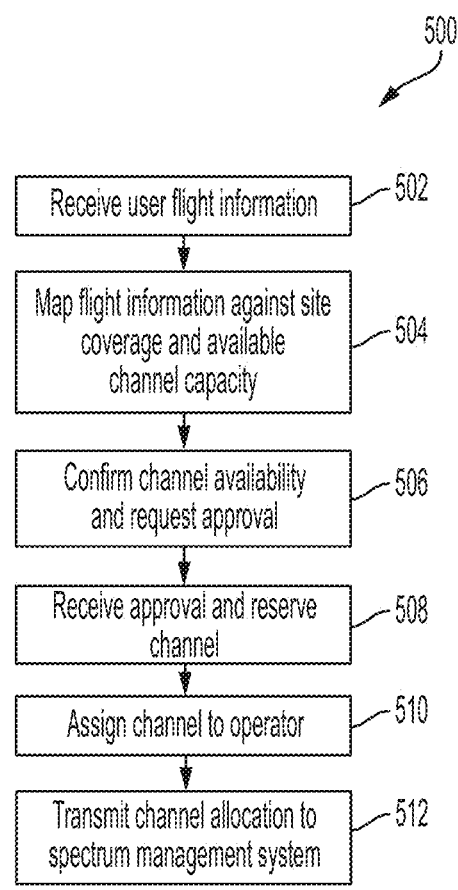
FIG. 5 illustrates an exemplary channel allocation process for RF spectrum management of ground to air communication networks according to examples of the disclosure.

FIG. 5 illustrates an exemplary channel allocation process for RF spectrum management of ground to air communication networks according to examples of the disclosure. The process 500 of FIG. 5 can illustrate the interactions between a pilot 302 and the digital twin 304 to receive an RF spectrum channel allocation as described above. In one or more examples, the process 500 can begin at step 502 wherein the system (via the digital twin 304) can receive flight information from a pilot or user of the system who wants to reserve an RF spectrum channel or channels for a given flight. As described above, and referring to FIG. 3, the flight information received at step 504 can include a flight plan, an aircraft/radio configuration, and a throughput requirement. Thus at step 502, the digital twin 304 can receive the information from the pilot/operator that is necessary to determine the RF channel needs of a given flight as well as the geographic locations and altitudes that the flight will occupy during its flight.

In one or more examples, once the information is received at step 502, the process 500 can move to step 504 wherein the received flight information can be mapped against site coverage and available channel capacity. In one or more examples, at step 504, the digital twin 304 can use the information received from the pilot 302 to determine if there is RF coverage for the entirety of the proposed flight (as determined by the dynamic link budget 308), the digital twin 304 can also allocate an available channel or channels from the traffic pool 314, and can determine if there will be any potential interference with the channel using the interference tool 312. In one or more examples, determining RF coverage for the entirety of the flight can include making sure that for each RF channel to be utilized by a flight plan, there are available time slots on the channel to facilitate transmissions from the aircraft associated with the flight plan. In one or more examples, determining RF coverage can include taking into account any factor that can have an effect on RF service such as sources of interferences. Thus, in one or more examples, mapping a flight plan against site coverage can not only include determining whether RF traffic resources are available for the flight, but can also include determining whether the quality of RF service during the flight meets an acceptable minimum threshold.

In one or more examples, once the flight has been mapped against site coverage and available channel capacity in order to select a channel or channels for use during the flight at step 504, the process 500 can move to step 506 wherein the availability of the channel is confirmed and an approval for the flight plan with channel allocation is requested. In one or more examples, a regulatory body such as the Federal Aviation Administration (FAA) may be required to approve any flight plans including channel allocations. Thus at step 506, once a channel has been allocated and the availability of the channel has been confirmed, the flight plan with spectrum allocation can be transmitted to the regulatory body for approval if required.

After mapping the flight against site coverage and available channel capacity in step 504, if in step 506 the system cannot confirm channel availability, in one or more examples, the system can reject the received flight plan and alert the user that the flight plan has been rejected. Additionally or alternatively, in one or more examples, in addition to rejecting a flight plan based on lack of channel availability, the system can provide the user with a suggested modified plan that allows the plane to travel from its intended origin to its intended destination (based on the user submitted flight plan) in a manner that will ensure RF channel availability throughout the flight. In one or more examples, modifying the flight plan can included modifying the intended geographic route of the aircraft (e.g., location and altitude information) based on the class of airspace the flight is being conducted in, based on the RF coverage availability of the communications network, or based on traffic channel availability of the communications network. Additionally or alternatively, in place of rerouting the flight, in one or more examples, the system can modify the time window (i.e., the time the flight can take off) in which the flight can be conducted based on traffic channel availability. Alternatively, in one or more examples, depending on the priority of the flight, instead of modifying the flight plan, the system can modify the ability of the communications network to support the flight plan (e.g., by changing or canceling another flight plan in the communications network based on its priority and alerting the user associated with that flight that that their flight plan has been changed or canceled). For instance, if the flight plan is submitted to the system by a user with high priority (for instance for a medical flight) then in one or more examples, the system can modify or cancel the flight plans of other lower priority flights in order to ensure RF channel availability for the priority flight during the flight proposed in the submitted flight plan for the priority flight.

In one or more examples, once the request for approval has been transmitted at step 506, the process 500 can move to step 508 wherein the approval from the regulatory body can be received. Additionally, at step 508, once the approval has been received, then the system (i.e., the digital twin 304, can reserve the channel or channels that were originally allocated to the flight and approved by the regulatory body. In one or more examples, once the channel has been reserved at step 508, the process 500 can move to step 510 wherein the reserved channel is assigned to the pilot and the aircraft for use when the flight plan is to be executed.

Referring back to FIG. 3, and as described above, the digital twin 304 can be responsible for allocating spectrum and planning operations for a flight, before the flight is to take place. However, the actual operations of the communications channel can be handled by a separate spectrum management system 322. In one or more examples, the digital twin 304 and the spectrum management system 304 can be implemented as a single system. Alternatively, the digital twin 304 and the spectrum management system 322 can be implemented as separate systems. In one or more examples of the disclosure, the spectrum management system 322 can be responsible for managing all of the communications link that are operating in a given communications network. Because the spectrum management system 322 is operating in real-time and must make decisions that can affect multiple communications link, in one or more examples, it can be advantageous to implement the digital twin 304 and the spectrum management system 322 on separate systems such that the operations of the digital twin 304 will not impact the speed at which the spectrum management system 322 performs its operations. In one or more examples, and as described below, the spectrum management 322 can be responsible for implementing and managing the communications links for all flights in a given air-to-ground communications network. Thus, once the spectrum requests are confirmed by the digital twin 304, execution and assignment of the communications channel with the allocated channel or channels can be performed on the spectrum management system 322. Referring back to the example of FIG. 5, once the channel or channels have been assigned to the operator by the digital twin 304 at step 510, the process 500 can move to step 510 wherein the channel allocation and other additional information about the channel can be sent to the spectrum management system 322 for implementation during flight. In one or more examples, the additional information can include other parameters regarding the communications channel to be predicted by the spectrum management system 322 such as the modulation scheme, error correction codes etc. Additionally, or alternatively, the rather than the digital twin 304 transmit the additional information, the spectrum management system 322 itself can determine the additional information needed to establish a given communications during the flight.

As described above, the spectrum management system 322 can be responsible for not only implementing all of the communication channels between the pilots 302 and the flight 336 in a given communications network, but can also be responsible for monitoring the links in real-time to ensure that they are operating according to their requirements during flight. In order to perform its implementation and monitoring tasks, in one or more examples, the spectrum management system 322 can be in communication with the each of the base stations 326 of the communications network via the base station controller 324 described above with respect to FIGS. 1-2. In one or more examples of the disclosure, each base station in the network can include one or more components and tools to assist the spectrum management system 322 in setting up and monitoring communication links in real-time as aircraft 336 transit the coverage area of the base station. The base station controller 324 can be communicatively coupled to the base station controller as to access the components and tools necessary to implement and monitor the communication links that the spectrum management system is charged with setting up and maintaining such as one or more antenna elements and tools used to monitor the RF environment of a given base station.

In one or more examples of the disclosure, the spectrum management system 322 can have access to and control a spectrum monitoring device 328 located at each base station 326 in the communications network. In one or more examples, the spectrum monitoring device can include one or more hardware components (such as antennas and sensors) that are collectively configured to monitor the RF environment of the base station 326. A spectrum monitoring device can be located at each and every base station in the communications network and can be configured to continuously measure the active RF environment of a base station for interference.

Figure 6:
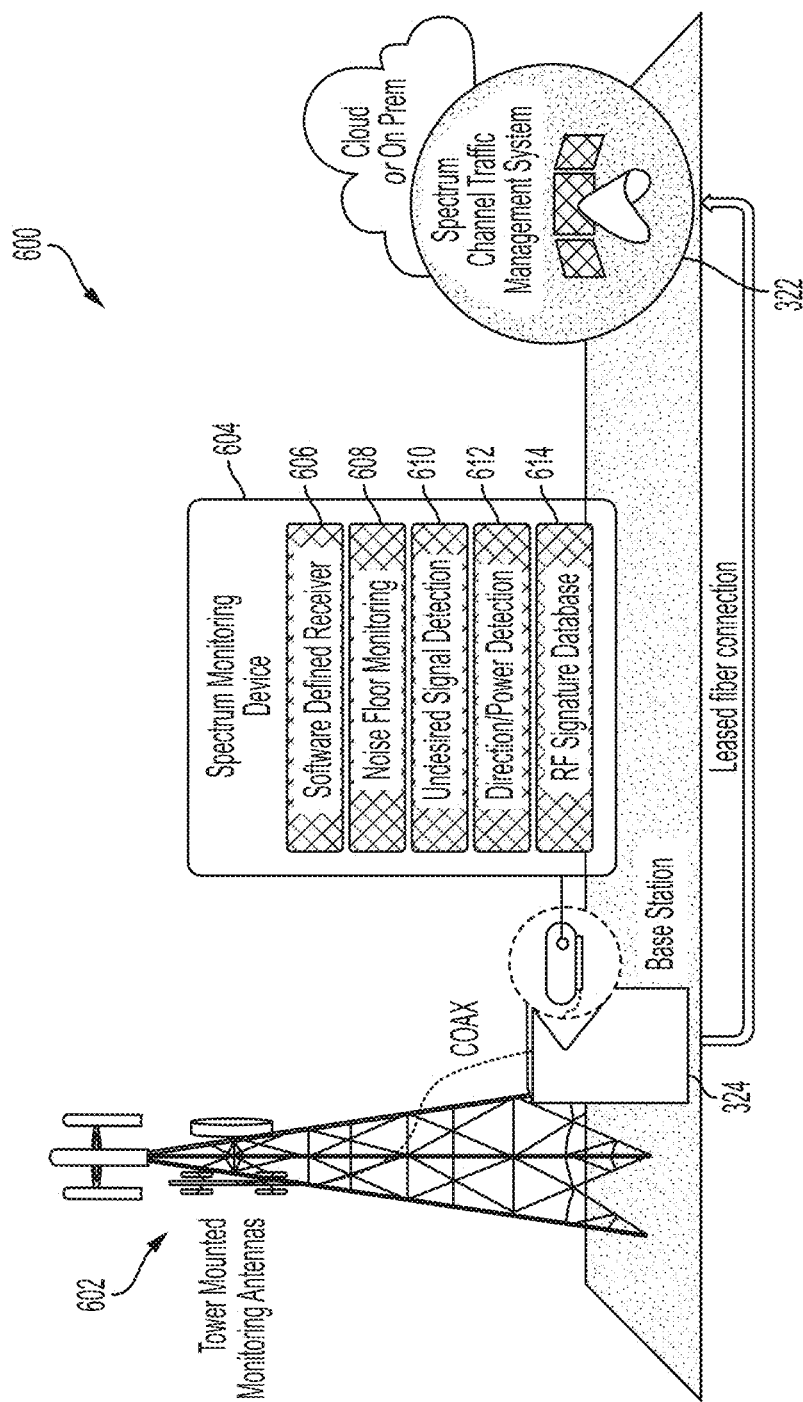
FIG. 6 illustrates an exemplary spectrum monitoring device according examples of the disclosure.

FIG. 6 illustrates an exemplary spectrum monitoring device according examples of the disclosure. In one or more examples the spectrum monitoring device 604 can be implemented in the base station controller 324 which can communicate information about the spectrum to the digital twin and the spectrum management updates so as to automatically and in real-time update the geofences managed by the spectrum management system. The base station controller 324 can be communicatively coupled (for example by a coax connection) to one or more tower mounted monitoring antennas 602 that can act as the sensors that the spectrum monitoring device uses to monitor the RF environment of the base station. In one or more examples, the antennas 602 may be mounted on a satellite. In one or more examples, the spectrum monitoring device 604 can include a software defined receiver 606 that can be configured to receive and process RF signals received by the monitoring antennas 602. The software defined receiver can be used by one or more components of the spectrum monitoring device 604 to perform the analysis required to monitor the RF environment of the base station.

In addition to detecting unwanted RF signals, the spectrum monitoring device 604 can include a direction/power detection component 612 that can detect the precise power and direction of the unwanted signal. As described in detail below, the base station can include a beam steering antenna that can be utilized to minimize or eliminate unwanted and potentially interfering RF signals. Thus, the direction/power detection component 612 can be used to determine at what power and direction the unwanted signal is coming from and can use a beam steering antenna to nullify or minimize the unwanted signal. In one or more examples, the beam steering antenna may be configured with an individual radio frequency front end for each individual traffic/resource channel. The radio frequency front ends may dynamically or directly adjust the power from the antenna towards the desired or undesired target to improve radio performance, reduce noise, increase radio link performance or system capacity, and provide additional power management capabilities. In one or more examples, the direction/power detection component 612 and beam steering antenna may be mounted on a satellite.

In one or more examples, the spectrum monitoring device 604 can include a RF signature database 614. The RF signature database 614 can allow for the spectrum monitoring device to compare any identified and unwanted RF signals against a database of known RF signature for identification. In one or more examples, if the RF signature of an unwanted interferer (such as a malicious user who is using the spectrum without permission) can be identified using the RF signature database, then the incident can be reported to a regulatory authority for potential action against the malicious user.

In one or more examples, the spectrum management system 322 can utilize the data generated by the spectrum monitoring device 604 to adjust the one or more communication channels in its charge so as to ensure that each communication link performs to its desired level of performance. Referring back to FIG. 3, the base station 326 can include one or more beam steering antenna components 330 configured to mitigate or eliminate unwanted RF signals from the base station coverage area. In one or more examples, RF interference can come from a known interference source such as a high altitude aircraft flying over an adjacent airspace, or from an uncooperative source such as a malicious user who is using the RF spectrum without permission. As a defense against these types of interferences, in one or more examples, the base station 326 can include a beam/null forming steering antenna 330 that can point a null at the interferer and work to either eliminate or substantially reduce the interference that the interferer may be causing to aircraft operating at the base station.

Figure 7:
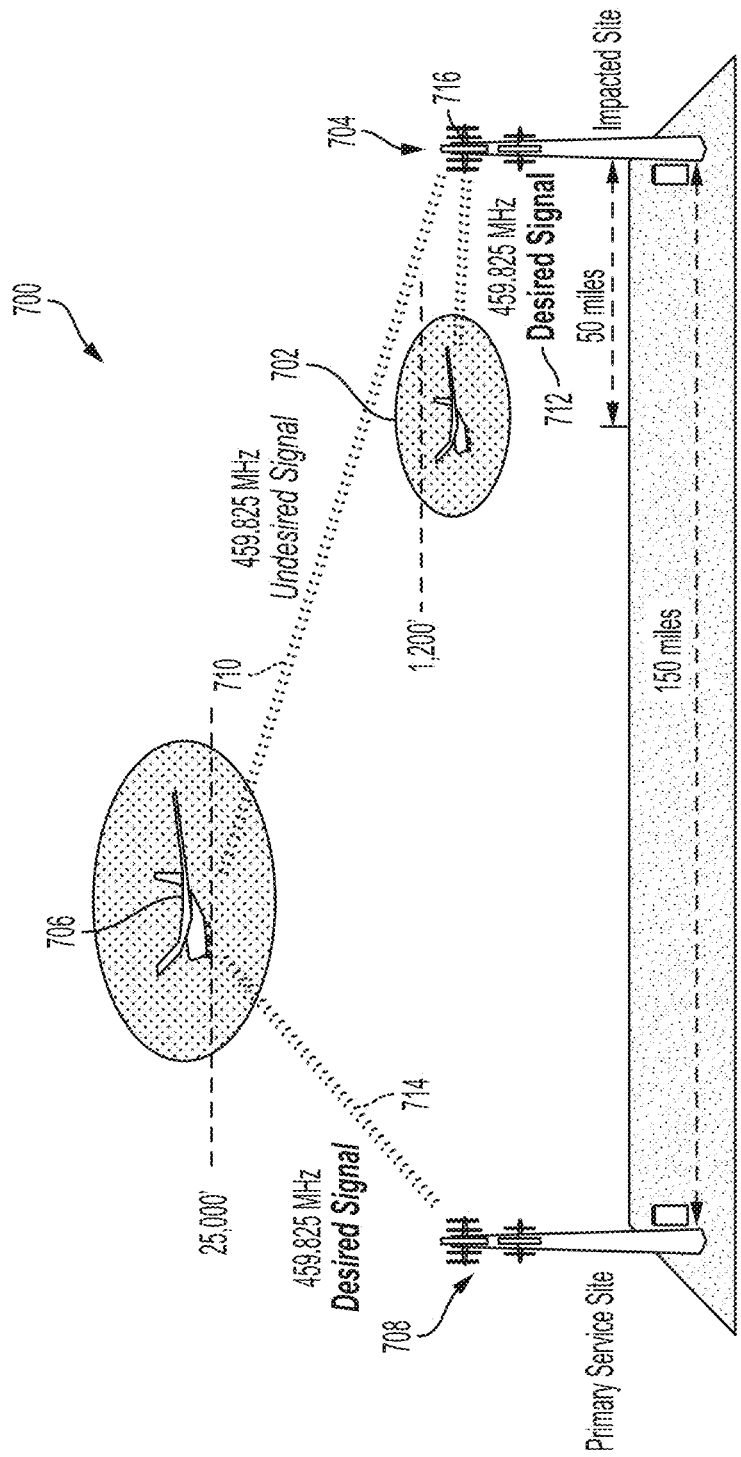
FIG. 7 illustrates an exemplary beam steering antenna system according to examples of the disclosure.

FIG. 7 illustrates an exemplary beam steering antenna system according to examples of the disclosure. FIG. 7 illustrates the exemplary beam steering antenna system in the context of a communications network 700 to better illustrate the features of the system. In one or more examples, communication network 700 can include two separate base stations 708 and base station 704. In one or more examples, base station 708 can transmit a desired signal 714 to an aircraft 706 that is transiting the coverage area of base station 708. In the example of FIG. 7, base station 708 is illustrated as transmitting an RF signal of 459.825 MHz. In one or more examples, the aircraft 706 can be flying at an altitude of 25,000 feet as shown in the figure.

In one or more examples, communications system 700 can also include a base station 704 that is operating in a coverage area that is adjacent to the coverage area of base station 708. In one or more examples, base station 704 can transmit a desired signal 712 to an aircraft 702 transiting its own coverage area at the same time that aircraft 706 is transmitting the coverage area of base station 708. In the example of FIG. 7, aircraft 702 is shown to be flying at 1,200 feet and communicating with base station 704 using an RF channel centered at 459.825 MHz, which is the same frequency that aircraft 706 is using to communicate with its corresponding base station 708.

As shown in FIG. 7, though aircraft 706 is operating at a different base station than aircraft 702, its communications with the base station 708 can cause interference with the communications of aircraft 702 with its base station 702. In one or more examples, owing to its relatively high altitude, the desired signal 714 of base station 708 (which is directed toward aircraft 706) can be seen by base station 704 in the form of undesired signal 710. Undesired signal 710, as it is caused by the communications between base station 708 and aircraft 706, can be at 459.825 MHz, which is the same frequency as signal 712 between aircraft 702 and base station 704. Thus, the undesired signal 710 can cause interference with the desired signal 712.

In one or more examples, using the spectrum monitoring device described above with respect to FIG. 6 as well as a base station link monitoring tool (described in detail below), the spectrum management system 322 knowledge of all known airborne radios on the network can validate or detect the presence of a known or unknown undesired signal 710 and utilize a beam/null forming steering antenna 716 that is mounted to a tower of the base station 704 to substantially reduce or eliminate the undesired signal 710 from the RF spectrum environment of aircraft 702. In one or more examples, beam/null forming steering antenna 716 may be mounted on a satellite. In one or more examples, the beam/null forming steering antenna 716 can be configured as a steerable antenna that can be pointed in the direction of an undesired signal. In one or more examples, the beam/null forming steering antenna 716 can be implemented as a phased array antenna with beam forming functionality that can be configured to transmit RF energy in a specific desired direction. In one or more examples, the direction of the beam can be controlled by a base station controller connected to the base station 704 or by the spectrum management system 322 directly. In one or more examples, if the beam/null forming steering antenna 716 is mounted on a satellite, the base station controller can communicate with the satellite to control the antenna to cause it to control the direction of the beam.

In one or more examples, if the spectrum management system 322 detects an undesired signal at a particular base station in the network, the spectrum management system 322, using the spectrum monitoring device, can determine the direction of the signal as well as the power of the signal (for instance by using direction/power detection component 612). Once the spectrum management system 322 has determined the power and direction of the undesired signal it can control the beam steering antenna 716 to form a null in the direction of the undesired signal and with the introduction of noise cancelling techniques like Successive Noise Cancellation and Multi User Detection together can substantially reduce the impact of the undesired signal in the RF coverage area of the base station 704. In one or more examples, the beam may be configured to transmit RF energy in a specified direction to cancel noise between desired and undesired targets.

Referring back to FIG. 3, in addition to the spectrum monitoring device 328, and the beam/null forming steering antenna 330, in one or more examples, the base station 326 includes a base station link monitoring functionality 332. In one or more examples, the base station link monitoring functionality 332 monitors each of the individual links that are assigned by the spectrum management system 322 at the base station 326. While the spectrum monitoring functionality 328 is configured to monitor all the active radio links individually of the base station 326, and can update real time the spectrum management system 322 to validate and adjust as needed the individual link predicted performance and utilization by the aircraft and operator.

In one or more examples, if the spectrum management system 322 detects conditions or interference of all communication links in the network, then it can work to mitigate any degradation in performance by adjusting the dynamic link budget, updating the dynamic RF coverage predictions implementing the beam/null forming steering antenna capabilities to apply a null at a detected source of interference and notify the operator of any coverage change. However, in one or more examples, if the spectrum management system 322 is unable to mitigate a situation through the techniques describe above, then the spectrum management system 322 can change the RF spectrum channel allocation of an individual aircraft in the network so as to find a more favorable communications channel for use. Thus, in one or more examples, the base station can include one or more sub-channel and resource blocks 334 that are reserved by the system to allocate to aircraft in-flight who may be experiencing service issues and need to change their frequency.

As described above with respect to FIG. 4A, one or more channels in the traffic channel pool 314 can be reserved for emergency purposes. The base station 326 being controlled by spectrum management system 322 can have access to these reserved channels for the purpose of allocating those channels to an aircraft mid-flight in case the originally allocated communications link fails or has an unacceptable quality of service. In one or more examples, the base station controller 324 can also be configured to operate the link once the flight is airborne. Additionally, the base station controller 324 can work during the flight to ensure that a quality RF communications link is provided to each and every aircraft in the communication network. Thus, when a pilot is ready to take off and execute their flight plan, in one or more examples the base station controller 324 can implement and manage the communication link for the duration of the flight using the parameters provided to it by spectrum management system 322. In one or more examples of the disclosure, the spectrum management system 322 can track the flight as it is occurring (using data from the base station controller 324) and can compare the flight plan submitted by the user to the actual flight. Once the flight has concluded, in one or more examples, the spectrum management system can notify the base station controller when the link is no longer needed, by deregistering the airborne radio of an aircraft from the network and returning the allocated RF spectrum channel to the traffic channel pool 314.

Figure 8:
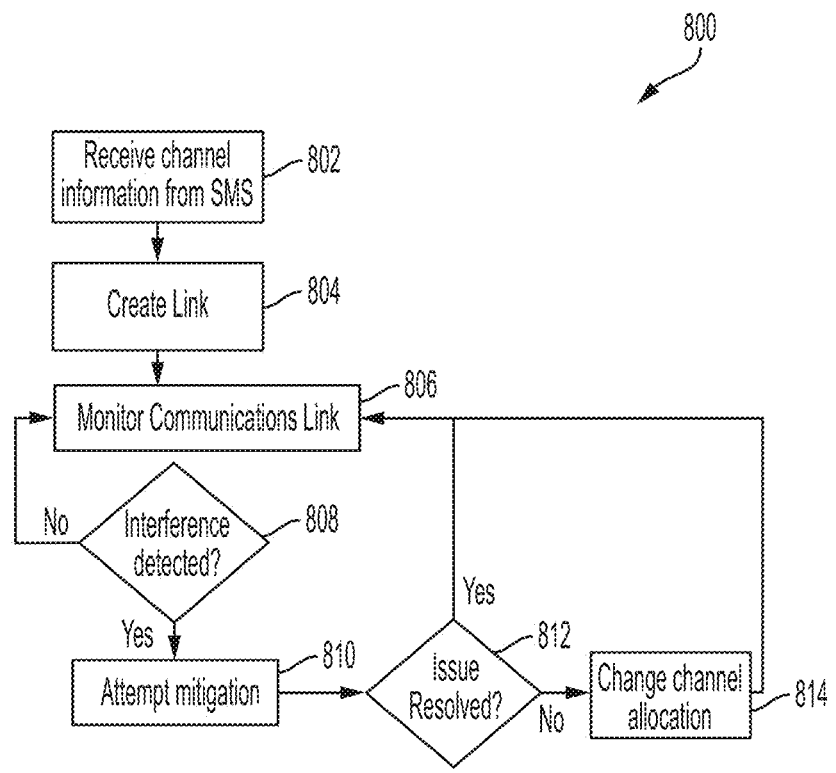
FIG. 8 illustrates an exemplary in-flight process for RF spectrum management of ground to air communication networks according to example of the disclosure.

FIG. 8 illustrates an exemplary in-flight process for RF spectrum management of ground to air communication networks according to example of the disclosure. In one or more examples, the process 800 of FIG. 8 can begin at step 802 wherein the channel information pertaining to a flight is received from the spectrum management system 322 at a base station controller 324. As discussed above, the digital twin 304 of FIG. 3 can be configured to ingest a flight plan and other data from a pilot and allocate an RF spectrum channel or channels for a traffic channel pool 314 based on the provided information. Once that channel has been allocated and other parameters regarding the channel have been determined, the digital twin 304 can transmit the information, which is then received by the spectrum management system 322 and transmitted to the base station controller 324 at step 802. The information provided from the spectrum management system 322 to the base station controller 324 can inform the base station control 324 as to how to provision a communication channels for a particular flight at the time the flight 336 is executed by the pilot 302.

When the flight is ready to commence per its flight plan, in one or more examples, the process 800 can move to step 804 wherein the base station controller 324 creates the communication link (using a beam forming antenna) using the communication link parameters transmitted by the spectrum management system 322 (which were generated by the digital twin 304). In one or more examples, creating the communication link can include pointing antennas in the appropriate direction (where the flight will be), setting the proper RF frequencies for transmitting and receiving signals at the base stations based on the allocated RF spectrum channel, and applying any other parameters such as modulation scheme and forward error correction code.

In one or more examples, once the link has been created at step 804 and the flight is in progress and is utilizing the communications link, the process 800 can move to step 806 wherein the communications is monitored by the base station controller 324 that is connected to the base station 326. In one or more examples, monitoring the communications link can include monitoring of the spectral environment of the base station using a spectrum monitor device 328 and/or a base station link monitoring tool 332, as described above. At step 804, the process 800 can monitor the link to ensure that the requirements of the link are being met at all times. As part of monitoring the link at step 804, the spectrum management system 322 can create, maintain, and update one or more geofences of the coverage areas associated with a base station by updating a real-time dynamic link budget, as well as coverage and interference applications for the flight. In one or more examples, the dynamic link budget can include the same parameters as the dynamic link budget kept by the digital twin, however rather than serving to predict future link performance, the dynamic link budget maintained by the spectrum management system can be updated in real-time to monitor link performance during the flight. In one or more examples, the dynamic link budget can be updated using information provided to the spectrum monitoring device 328 and the base station link monitoring tool 332.

Once the monitoring begins at step 806, the process 800 can move to step 808 wherein a determination is made as to whether the communications link is being interfered with. In one or more examples, the interference can be detected by changes to the dynamic link budget or directly from the spectrum monitoring device 329 and/or link monitoring tool 332. In one or more examples, if no interference is detected at step 808, the process 800 can revert back to step 806 wherein the communications link is further monitored for interference. If, however, at step 808 interference is detected, then the process 800 can move to step 810 wherein the spectrum management system or the base station controller attempts to mitigate the interference. In one or more examples, mitigating the interference can include adjusting the Geofence that includes the dynamic link budget, changing traffic channels, and/or notifying pilot of available geofenced service area. Additionally or alternatively, interference can be mitigated using the beam steering antenna described above with respect to FIG. 7 to apply a null signal in the direction and frequency of the interferer to try and mitigate its effect on the communications link of the flight.

In one or more examples, and after the mitigation has been applied at step 810, the process 800 can move to step 812 wherein a determination is made as to whether the issue that prompted the mitigation at step 810 has resolved the issue. In one or more examples of the disclosure, determining whether the issue has resolved can include looking to the dynamic link budget (as updated in response to the mitigation) to see if the communications link is now operating according to its requirements. In one or more examples, if the issue has been resolved as determined at step 812, the process 800 can revert back to step 806 wherein the link is further monitored.

If, however, the issue is not resolved as determined at step 812, the process 800 can move to step 814 wherein the spectrum management system 322 can change the channel allocated to the flight for instance by allocating one of the reserved channels to the flight from the traffic channel pool. As described above, the channels that are reserved from the traffic channel pool for emergency uses can be used in situations where the allocated channel for a flight is no longer serviceable, or in situations where the flight plan is changed (for example by changing how long the flight will be in the air) such that the channel it was originally allocated may not be available for the entire flight. Thus, in one or more examples, at step 814 the process 800 can change the allocated channel of the flight to a reserved channel in an attempt to still provide the flight with a reliable and continuous channel. In one or more examples, as part of the process of changing the channel at step 814, the spectrum management system 322 can inform the pilot as well as the aircraft about the change.

As described above, the spectrum management system 322 can setup and monitor a communications link for the duration of a flight, and has the capability to take action should a reliable and continuous communication link become threatened during a flight. In conjunction with the digital twin 304, the entire system can plan a communications channel for flight, implement the communications for the flight, and respond to issues with the communications links of flight during the flight.

As described above, spectrum management system 322 may interact with other spectrum management systems to form a network of networks that works efficiently to solve the coverage requirements to service a specific flight plan. A network of networks could coordinate coverage from one or more wireless network operators when a single spectrum management system is unable to meet the needs of the requested flight plan. A network of networks may also coordinate multiple spectrum management systems to allow for the best wireless connectivity to be utilized during a flight to provide more reliable network connection over a greater geographical area.

Figure 9:
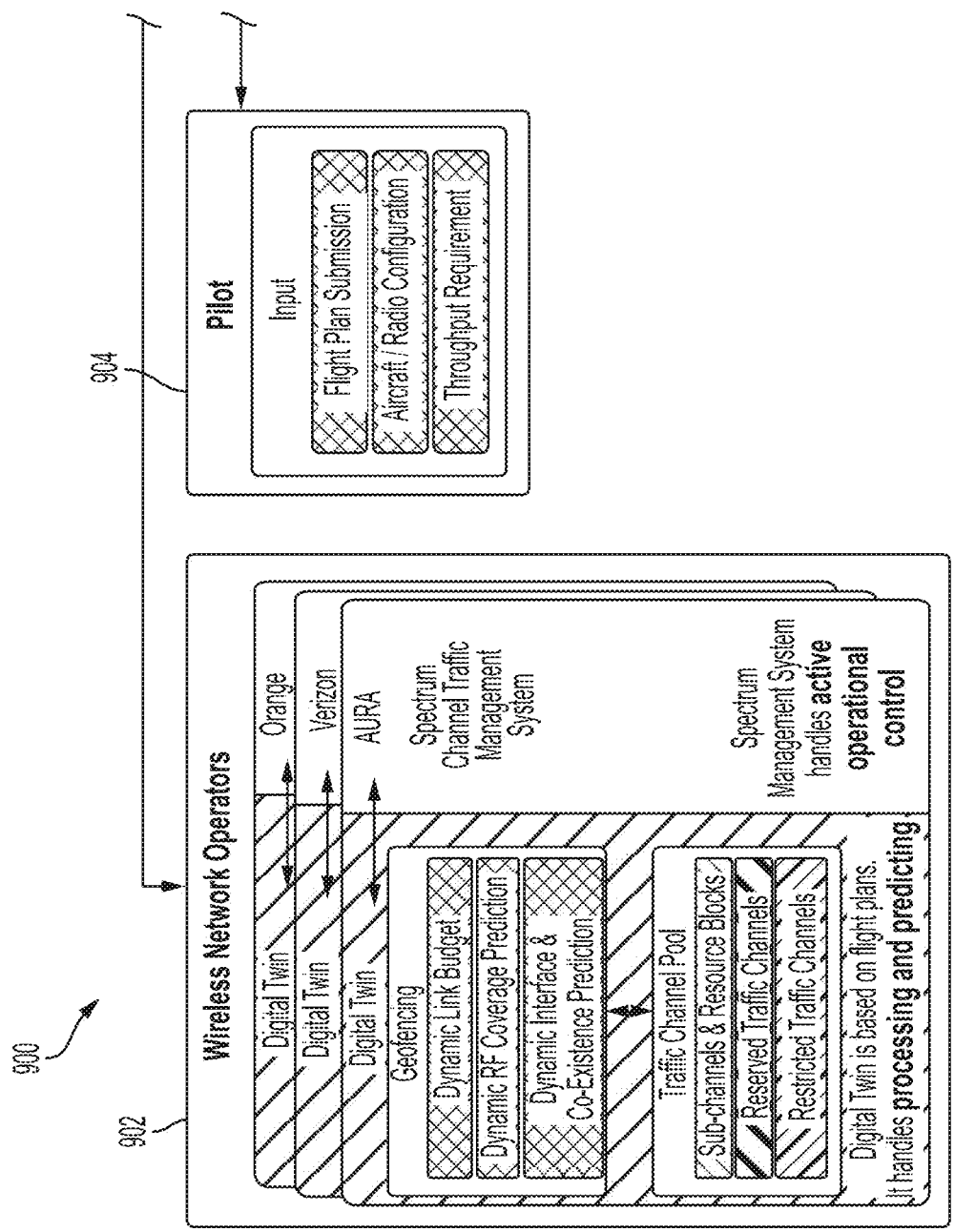
FIG. 9 illustrates an exemplary system for network of networks according to examples of the disclosure.
Figure 9:
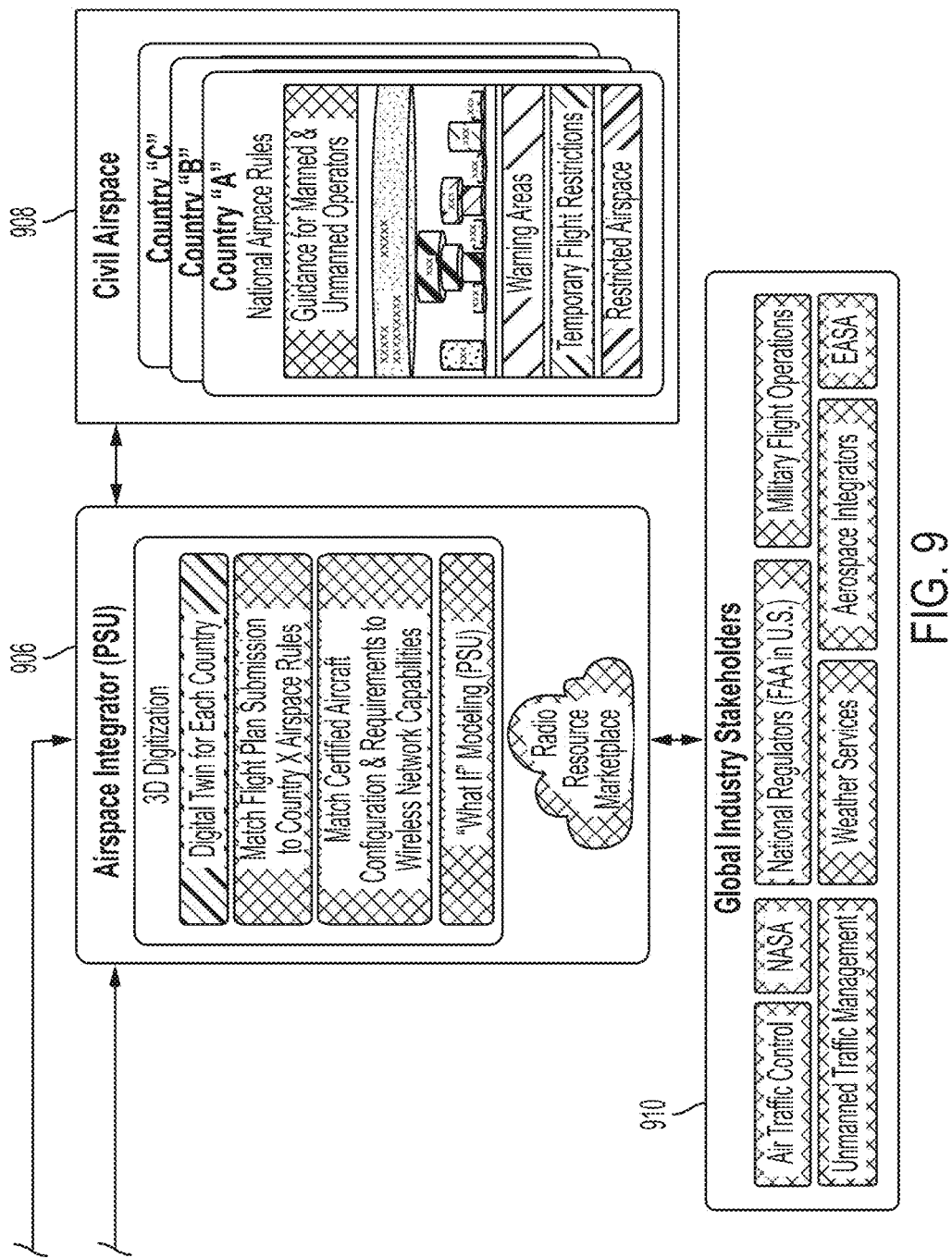

FIG. 9 illustrates an exemplary system for network of networks according to examples of the disclosure. The network of networks 900 may include one or more wireless network operators 902. In one or more examples, each network in the one or more wireless network operators 902 may include a spectrum management system with a digital twin that operates according the descriptions above.

The network of networks 900 may include pilot 904. Pilot 904 may be an example of pilot 304 shown in FIG. 3. Pilot 904 may provide inputs to the network of networks 900. In one or more examples, the pilot 904 may submit flight plans, configure aircrafts and radios, and/or input throughput requirements. Input from pilot 904 may be used by airspace integrator 906 to implement communication channels of wireless network operators 902.

In one or more examples, the coordination of multiple wireless network operators 902 may be performed by an airspace integrator 906. Airspace integrator 906 may allow multiple wireless network operators 902 to work efficiently together to solve the coverage requirements of a flight plan when coverage with one specific wireless service with a specific spectrum management system is unable to meet the needs of the requested flight plan.

In one or more examples, airspace integrator 906 may include information from global stakeholders 910. Global stakeholders 910 may include air traffic controls, NASA, national regulators, military flight operators, aerospace integrators, weather services, EASA, and unmanned traffic management systems. In one or more examples, airspace integrator 906 may include rules related to countries' civil airspace 908, The airspace integrator 906 may use the integrated information from global industry stakeholder 910 and civil airspace 908 to allocate physical space for aircrafts, as well as assist the wireless network operators 902 with their spectrum management systems to ensure predictable flight performances based on submitted flight plans.

Figure 10:
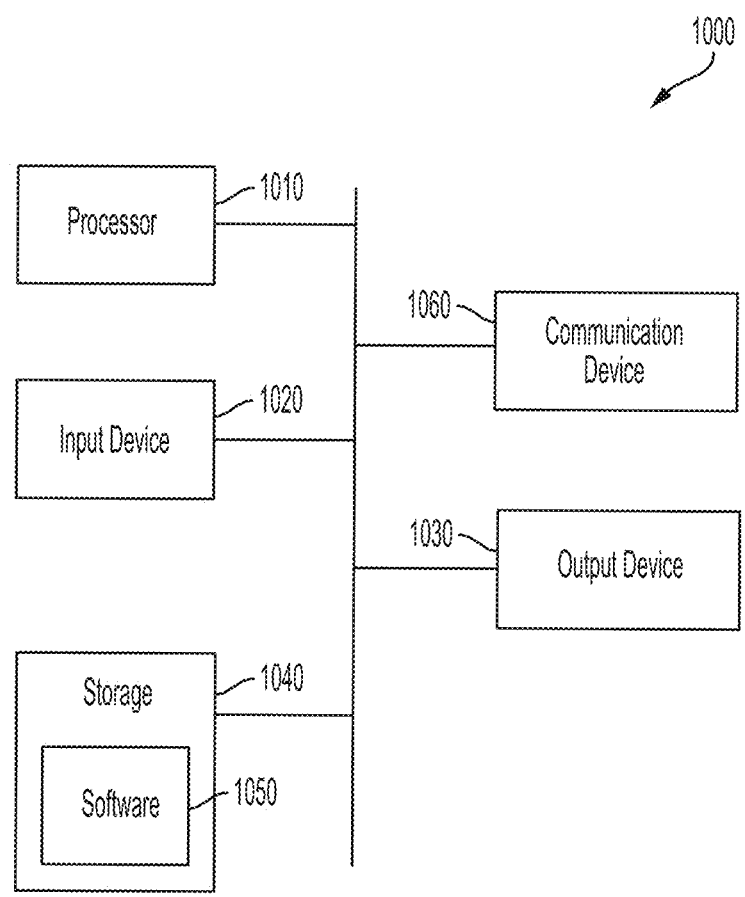
FIG. 10 illustrates an exemplary computing system, according to examples of the disclosure.

FIG. 10 illustrates an example of a computing system 1000, in accordance with some embodiments System 1000 can be a client or a server. As shown in FIG. 10, system 1000 can be any suitable type of processor-based system, such as a personal computer, workstation, server, handheld computing device (portable electronic device) such as a phone or tablet, or dedicated device. The system 1000 can include, for example, one or more of input device 1020, output device 1030, one or more processors 1010, storage 1040, and communication device 1060. Input device 1020 and output device 1030 can generally correspond to those described above and can either be connectable or integrated with the computer.

Input device 1020 can be any suitable device that provides input, such as a touch screen, keyboard or keypad, mouse, gesture recognition component of a virtual/augmented reality system, or voice-recognition device. Output device 1030 can be or include any suitable device that provides output, such as a display, touch screen, haptics device, virtual/augmented reality display, or speaker.

Storage 1040 can be any suitable device that provides storage, such as an electrical, magnetic, or optical memory including a RAM, cache, hard drive, removable storage disk, or other non-transitory computer readable medium. Communication device 1060 can include any suitable device capable of transmitting and receiving signals over a network, such as a network interface chip or device. The components of the computing system 1000 can be connected in any suitable manner, such as via a physical bus or wirelessly.

Processor(s) 1010 can be any suitable processor or combination of processors, including any of, or any combination of, a central processing unit (CPU), field programmable gate array (FPGA), and application-specific integrated circuit (ASIC). Software 1050, which can be stored in storage 1040 and executed by one or more processors 1010, can include, for example, the programming that embodies the functionality or portions of the functionality of the present disclosure (e.g., as embodied in the devices as described above)

Software 1050 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1040, that can contain or store programming for use by or in connection with an instruction execution system, apparatus, or device.

Software 1050 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport computer readable medium can include, but is not limited to, an electronic, magnetic, optical, electromagnetic, or infrared wired or wireless propagation medium.

System 1000 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 1000 can implement any operating system suitable for operating on the network. Software 1050 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated. For the purpose of clarity and a concise description, features are described herein as part of the same or separate embodiments; however, it will be appreciated that the scope of the disclosure includes embodiments having combinations of all or some of the features described.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for allocating radio frequency (RF) spectrum traffic resources in an air-to-ground communications network, the method comprising:
    receiving a flight plan from a user, wherein the flight plan comprises timing, location, and altitude information for a flight that is to fly in one or more coverage areas of the air-to-ground communications network, wherein the received flight plan includes a plurality of flight segments;
    determining RF communication channel availability for each flight segment of the plurality of flight segments based on the received flight plan from the user, wherein determining RF communication channel availability for each flight segment of the plurality of flight segments comprises:
        selecting an RF spectrum traffic resource from a traffic resource pool based on the received flight plan; and
        determining that a performance of the selected RF spectrum traffic resource is a above a pre-determined threshold, wherein the determination is based on one or more RF spectrum traffic resources previously reserved for one or more flight plans from other users, and wherein the determination is based on radio configuration information associated with the received flight plan; and
    in accordance with determining RF communication channel availability for each flight segment of the plurality of flight segment, reserving the selected RF spectrum traffic resource associated with each flight segment of the plurality of flight segments for the received flight plan, prior to commencement of the flight.

2. The method of claim 1, wherein the method comprises determining a throughput requirement of the aircraft based on the radio configuration information associated with the received flight plan.

3. The method of claim 1, wherein determining RF communication channel availability in the one or more coverage areas of the communications network based on the received flight plan from the user comprises:
    generating one or more dynamic link budgets for the flight based on the received flight plan, wherein each dynamic link budget is configured to determine RF spectrum availability of a communications link in one or more coverage areas of the communications network;
    generating one or more geofences based on the dynamic link budget; and
    determining RF spectrum availability based on the dynamic link budgets corresponding to the one or more coverage areas of the communications network that the aircraft is to fly in based on the received flight plan from the user.

4. The method of claim 3, wherein generating the one or more dynamic link budgets for the flight includes using a dynamic RF coverage prediction tool to populate one or more parameters of the one or more dynamic link budgets.

5. The method of claim 1, wherein selecting an RF spectrum traffic resource from the traffic resource pool comprises determining a number of RF spectrum traffic resources to assign to the flight based on a throughput requirement of the flight.

6. The method of claim 5, wherein selecting an RF spectrum traffic resource from the traffic resource pool comprises selecting the determined number of RF spectrum traffic resources from the available RF spectrum traffic resources in the traffic resource pool.

7. The method of claim 1, wherein the RF spectrum resources include one or more RF spectrum channels, wherein each RF spectrum channel of the one or more RF spectrum channels from the traffic channel pool comprises a plurality of time slots, wherein the plurality of time slots are configured to be allocated to a plurality of aircraft such that the plurality of aircraft each communicate using the RF spectrum channel during their respective time slot.

8. The method of claim 7, wherein determining RF availability in the one or more coverage areas of the communications network comprises determining whether a selected RF spectrum channel has an available time slot from the plurality of time slots to be allocated to received flight plan.

9. The method of claim 1, wherein in accordance with determining that the performance of the selected RF spectrum traffic resource is below the pre-determined threshold, rejecting the received flight plan and alerting the user that the flight plan has been rejected.

10. The method of claim 1, wherein in accordance with determining that the performance of the selected RF spectrum traffic resource is below the pre-determined threshold, modifying the received flight plan.

11. The method of claim 10, wherein modifying the received flight plan comprises modifying the location and altitude information of the flight plan based on the class of airspace the flight is being conducted in.

12. The method of claim 10, wherein modifying the received flight plan comprises modifying the location and altitude information of the flight plan based on the RF coverage availability of the communications network.

13. The method of claim 10, wherein modifying the received flight plan comprises modifying the location and altitude information of the flight plan based on RF traffic resource availability of the communications network.

14. The method of claim 1, wherein in accordance with determining that the performance of the selected RF spectrum traffic resource is below the pre-determined threshold, changing or canceling another flight plan in the communications network and alerting the user associated with that flight that their flight plan has been changed or canceled.

15. A system for allocating radio frequency (RF) spectrum traffic resources in an air-to-ground communications network, the system comprising:
a memory;
one or more processors;
wherein the memory stores one or more programs that when executed by the one or more processors, cause the one or more processors to:
receive a flight plan from a user, wherein the flight plan comprises timing, location, and altitude information for a flight that is to fly in one or more coverage areas of the air-to-ground communications network, wherein the received flight plan includes a plurality of flight segments;
determine RF communication channel availability for each flight segment of the plurality of flight segments based on the received flight plan from the user, wherein determining RF communication channel availability for each flight segment of the plurality of flight segments comprises:
select an RF spectrum traffic resource from a traffic resource pool based on the received flight plan; and
determine that a performance of the selected RF spectrum traffic resource is a above a pre-determined threshold, wherein the determination is based on one or more RF spectrum traffic resources previously reserved for one or more flight plans from other users, and wherein the determination is based on radio configuration information associated with the received flight plan; and
in accordance with determining RF communication channel availability for each flight segment of the plurality of flight segment, reserve the selected RF spectrum traffic resource associated with each flight segment of the plurality of flight segments for the received flight plan, prior to commencement of the flight.

16. The system of claim 15, wherein the one or more processors are caused to determine a throughput requirement of the aircraft based on the radio configuration information associated with the received flight plan.

17. The system of claim 15, wherein determining RF communication channel availability in the one or more coverage areas of the communications network based on the received flight plan from the user comprises:
generating one or more dynamic link budgets for the flight based on the received flight plan, wherein each dynamic link budget is configured to determine RF spectrum availability of a communications link in one or more coverage areas of the communications network;
generating one or more geofences based on the dynamic link budget; and
determining RF spectrum availability based on the dynamic link budgets corresponding to the one or more coverage areas of the communications network that the aircraft is to fly in based on the received flight plan from the user.

18. The system of claim 17, wherein generating the one or more dynamic link budgets for the flight includes using a dynamic RF coverage prediction tool to populate one or more parameters of the one or more dynamic link budgets.

19. The system of claim 15, wherein selecting an RF spectrum traffic resource from the traffic resource pool comprises determining a number of RF spectrum traffic resources to assign to the flight based on a throughput requirement of the flight.

20. The system of claim 19, wherein selecting an RF spectrum traffic resource from the traffic resource pool comprises selecting the determined number of RF spectrum traffic resources from the available RF spectrum traffic resources in the traffic resource pool.

21. The system of claim 15, wherein the RF spectrum resources include one or more RF spectrum channels, wherein each RF spectrum channel of the one or more RF spectrum channels from the traffic channel pool comprises a plurality of time slots, wherein the plurality of time slots are configured to be allocated to a plurality of aircraft such that the plurality of aircraft each communicate using the RF spectrum channel during their respective time slot.

22. The system of claim 21, wherein determining RF availability in the one or more coverage areas of the communications network comprises determining whether a selected RF spectrum channel has an available time slot from the plurality of time slots to be allocated to received flight plan.

23. The system of claim 15, wherein in accordance with determining that the performance of the selected RF spectrum traffic resource is below the pre-determined threshold, rejecting the received flight plan and alerting the user that the flight plan has been rejected.

24. The system of claim 15, wherein in accordance with determining that the performance of the selected RF spectrum traffic resource is below the pre-determined threshold, modifying the received flight plan.

25. The system of claim 24, wherein modifying the received flight plan comprises modifying the location and altitude information of the flight plan based on the class of airspace the flight is being conducted in.

26. The system of claim 24, wherein modifying the received flight plan comprises modifying the location and altitude information of the flight plan based on the RF coverage availability of the communications network.

27. The system of claim 24, wherein modifying the received flight plan comprises modifying the location and altitude information of the flight plan based on RF traffic resource availability of the communications network.

28. The system of claim 15, wherein in accordance with determining that the performance of the selected RF spectrum traffic resource is below the pre-determined threshold, changing or canceling another flight plan in the communications network and alerting the user associated with that flight that their flight plan has been changed or canceled.

29. A non-transitory computer readable storage medium storing one or more programs for allocating RF spectrum channels in an air-to-ground communications network, for execution by one or more processors of an electronic device that when executed by the device, cause the device to:
receive a flight plan from a user, wherein the flight plan comprises timing, location, and altitude information for a flight that is to fly in one or more coverage areas of the air-to-ground communications network, wherein the received flight plan includes a plurality of flight segments;

determine RF communication channel availability for each flight segment of the plurality of flight segments based on the received flight plan from the user, wherein determining RF communication channel availability for each flight segment of the plurality of flight segments comprises:
  select an RF spectrum traffic resource from a traffic resource pool based on the received flight plan; and
  determine that a performance of the selected RF spectrum traffic resource is a above a pre-determined threshold, wherein the determination is based on one or more RF spectrum traffic resources previously reserved for one or more flight plans from other users, and wherein the determination is based on radio configuration information associated with the received flight plan; and
in accordance with determining RF communication channel availability for each flight segment of the plurality of flight segment, reserve the selected RF spectrum traffic resource associated with each flight segment of the plurality of flight segments for the received flight plan, prior to commencement of the flight.

30. The non-transitory computer readable storage medium of claim 29, wherein the device is caused to determine a throughput requirement of the aircraft based on the radio configuration information associated with the received flight plan.

31. The non-transitory computer readable storage medium of claim 29, wherein determining RF communication channel availability in the one or more coverage areas of the communications network based on the received flight plan from the user comprises:
  generating one or more dynamic link budgets for the flight based on the received flight plan, wherein each dynamic link budget is configured to determine RF spectrum availability of a communications link in one or more coverage areas of the communications network;
  generating one or more geofences based on the dynamic link budget; and
  determining RF spectrum availability based on the dynamic link budgets corresponding to the one or more coverage areas of the communications network that the aircraft is to fly in based on the received flight plan from the user.

32. The non-transitory computer readable storage medium of claim 31, wherein generating the one or more dynamic link budgets for the flight includes using a dynamic RF coverage prediction tool to populate one or more parameters of the one or more dynamic link budgets.

33. The non-transitory computer readable storage medium of claim 29, wherein selecting an RF spectrum traffic resource from the traffic resource pool comprises determining a number of RF spectrum traffic resources to assign to the flight based on a throughput requirement of the flight.

34. The non-transitory computer readable storage medium of claim 33, wherein selecting an RF spectrum traffic resource from the traffic resource pool comprises selecting the determined number of RF spectrum traffic resources from the available RF spectrum traffic resources in the traffic resource pool.

35. The non-transitory computer readable storage medium of claim 29, wherein the RF spectrum resources include one or more RF spectrum channels, wherein each RF spectrum channel of the one or more RF spectrum channels from the traffic channel pool comprises a plurality of time slots, wherein the plurality of time slots are configured to be allocated to a plurality of aircraft such that the plurality of aircraft each communicate using the RF spectrum channel during their respective time slot.

36. The non-transitory computer readable storage medium of claim 35, wherein determining RF availability in the one or more coverage areas of the communications network comprises determining whether a selected RF spectrum channel has an available time slot from the plurality of time slots to be allocated to received flight plan.

37. The non-transitory computer readable storage medium of claim 29, wherein in accordance with determining that the performance of the selected RF spectrum traffic resource is below the pre-determined threshold, rejecting the received flight plan and alerting the user that the flight plan has been rejected.

38. The non-transitory computer readable storage medium of claim 29, wherein in accordance with determining that the performance of the selected RF spectrum traffic resource is below the pre-determined threshold, modifying the received flight plan.

39. The non-transitory computer readable storage medium of claim 38, wherein modifying the received flight plan comprises modifying the location and altitude information of the flight plan based on the class of airspace the flight is being conducted in.

40. The non-transitory computer readable storage medium of claim 38, wherein modifying the received flight plan comprises modifying the location and altitude information of the flight plan based on the RF coverage availability of the communications network.

41. The non-transitory computer readable storage medium of claim 38, wherein modifying the received flight plan comprises modifying the location and altitude information of the flight plan based on RF traffic resource availability of the communications network.

42. The non-transitory computer readable storage medium of claim 29, wherein in accordance with determining that the performance of the selected RF spectrum traffic resource is below the pre-determined threshold, changing or canceling another flight plan in the communications network and alerting the user associated with that flight that their flight plan has been changed or canceled.

* * * * *